US012629687B2

(12) United States Patent
Kuwata

(10) Patent No.: US 12,629,687 B2
(45) Date of Patent: May 19, 2026

(54) TREATMENT APPARATUS, NUCLEIC ACID EXTRACTION SYSTEM, AND NUCLEIC ACID ANALYSIS SYSTEM

(71) Applicant: Yokogawa Electric Corporation, Tokyo (JP)

(72) Inventor: Masahiro Kuwata, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 579 days.

(21) Appl. No.: 18/037,033

(22) PCT Filed: Nov. 4, 2021

(86) PCT No.: PCT/JP2021/040563
§ 371 (c)(1),
(2) Date: May 15, 2023

(87) PCT Pub. No.: WO2022/107604
PCT Pub. Date: May 27, 2022

(65) Prior Publication Data
US 2023/0405598 A1 Dec. 21, 2023

(30) Foreign Application Priority Data
Nov. 19, 2020 (JP) ................................ 2020-192548

(51) Int. Cl.
*B01L 7/00* (2006.01)

(52) U.S. Cl.
CPC ......... *B01L 7/5255* (2013.01); *B01L 2200/02* (2013.01); *B01L 2200/0689* (2013.01); *B01L 2300/041* (2013.01); *B01L 2300/1805* (2013.01)

(58) Field of Classification Search
None
See application file for complete search history.

(56) References Cited

U.S. PATENT DOCUMENTS 5,795,547 A * 8/1998 Moser ....................... B01L 7/52 435/303.1
6,153,426 A 11/2000 Heimberg
(Continued)

FOREIGN PATENT DOCUMENTS

CN 110062659 A 7/2019
CN 110157590 A 8/2019
(Continued)

OTHER PUBLICATIONS

Extended European Search Report (EESR) dated Sep. 9, 2024 issued in European patent application No. 21894478.3.
(Continued)

*Primary Examiner* — P. Kathryn Wright
(74) *Attorney, Agent, or Firm* — RANKIN, HILL & CLARK LLP

(57) ABSTRACT

A container (30) includes a plurality of accommodation portions (310) accommodating the sample, and a lid portion (320) closing the plurality of accommodation portions (310). The treatment apparatus (6) includes a container support portion (41) configured to support the plurality of accommodation portions (310), and a container fixing portion (42) configured to overlap the lid portion (320). The container fixing portion (42) is configured to sandwich the container (30) together with the container support portion (41). The container fixing portion (42) is provided in a manner of being able to be opened and closed with respect to the container support portion (41). A plurality of hole portions (411) are provided in the container support portion (41). A plurality of hook portions (420) inserted into the plurality of hole portions (411) and engaging with edge portions (**411*a*) of the plurality of hole portions (411) are provided in the container fixing portion (42**).

18 Claims, 13 Drawing Sheets

(56) References Cited

U.S. PATENT DOCUMENTS

| | | | | |
|---|---|---|---|---|
| 2005/0282270 | A1 | 12/2005 | Shin et al. | |
| 2009/0269835 | A1* | 10/2009 | Ceremony | B01L 7/52 435/286.2 |
| 2012/0197008 | A1 | 8/2012 | Ozeki et al. | |
| 2017/0173586 | A1* | 6/2017 | Tan | B01L 7/52 |
| 2019/0111435 | A1 | 4/2019 | Gong et al. | |
| 2019/0329261 | A1* | 10/2019 | Won | B01L 9/06 |
| 2020/0368751 | A1 | 11/2020 | Tsai | |

FOREIGN PATENT DOCUMENTS

| | | | |
|---|---|---|---|
| EP | 0488769 | A2 | 6/1992 |
| JP | 2000-189152 | A | 7/2000 |
| JP | 2011-19537 | A | 2/2011 |
| JP | 2014-190357 | A | 10/2014 |
| JP | 5624487 | B2 | 11/2014 |
| WO | 2018/174818 | A1 | 9/2018 |
| WO | 2019/158131 | A1 | 8/2019 |

OTHER PUBLICATIONS

Chinese Office Action (CNOA) dated Novembetr 21, 2025 for Chinese Patent Application No. 202180077164.2; English machine translation.

* cited by examiner

TREATMENT APPARATUS, NUCLEIC ACID EXTRACTION SYSTEM, AND NUCLEIC ACID ANALYSIS SYSTEM

TECHNICAL FIELD

The present invention relates to a treatment apparatus, a nucleic acid extraction system, and a nucleic acid analysis system.

BACKGROUND ART

In order to extract nucleic acid from cells, there is a need to destroy (dissolve) membrane structures of cells and release contents of the cells to the outside of the cells. The following Patent Document 1 discloses a method for extracting nucleic acid from cells by performing treatment of a container accommodating a sample including a liquid at a high temperature of 100° C. or higher. The following Patent Document 2 discloses a constitution in which a container lid portion is pressed by causing a surface plate to abut the container lid portion in order to heat a sample inside a container to a temperature near the boiling point when a polymerase chain reaction is performed.

CITATION LIST

Patent Document

[Patent Document 1]
Japanese Patent No. 5624487
[Patent Document 2]
Japanese Unexamined Patent Application Publication No. 2011-19537

SUMMARY OF INVENTION

Technical Problem

Incidentally, when treatment is performed at a high temperature of 100° C. or higher as in Patent Document 1, a high internal pressure is applied to each container accommodating a sample. For this reason, there is a need for a treatment apparatus to restrain a resultant force of internal pressures generated in respective containers. However, Patent Documents 1 and 2 do not mention a pressure-resistant structure in a case in which such a high internal pressure is applied. If a gap is generated in a part of a container lid portion due to an internal pressure, vapor of a sample leaks out of a container and the amount of sample decreases. In addition, if vapor of a sample leaks out of a container, the sample temperature does not rise to an expected temperature due to latent heat from evaporation of the sample, and therefore an intended reaction does not occur.

The present invention has been made in consideration of the foregoing circumstances, and an object thereof is to provide a treatment apparatus, a nucleic acid extraction system, and a nucleic acid analysis system capable of curbing leakage of vapor of a sample to the outside of a container.

Solution to Problem (1) A treatment apparatus according to an aspect of the present invention may include: a heat treatment device configured to perform heat treatment of a container accommodating a sample; and a movement device configured to relatively move the container with respect to the heat treatment device. The container may include a plurality of accommodation portions accommodating the sample; and a lid portion closing the plurality of accommodation portions. The movement device may include: a container support portion configured to support the plurality of accommodation portions; and a container fixing portion configured to overlap the lid portion, the container fixing portion being configured to sandwich the container together with the container support portion, and the container fixing portion being provided in a manner of being able to be opened and closed with respect to the container support portion. A plurality of hole portions may be provided in any one of the container support portion and the container fixing portion. A plurality of hook portions inserted into the plurality of hole portions and engaging with edge portions of the plurality of hole portions may be provided in the other of the container support portion and the container fixing portion.

(2) In the treatment apparatus according to the foregoing (1), the movement device may include a release restriction portion switching between a locked state in which the plurality of hook portions engage with the edge portions of the plurality of hole portions and the container fixing portion is unable to be released with respect to the container support portion and an unlocked state in which the plurality of hook portions are separated from the edge portions of the plurality of hole portions and the container fixing portion is able to be released with respect to the container support portion in response to relative parallel movement between the container support portion and the container fixing portion.

(3) In the treatment apparatus according to the foregoing (2), the release restriction portion may include: a turning shaft provided in any one of the container support portion and the container fixing portion, the turning shaft including a pair of curved surface portions and a pair of flat surface portions connecting end portions of the pair of curved surface portions to each other on a circumferential surface; and a bearing portion provided in the other of the container support portion and the container fixing portion, the bearing portion having a round hole in which the turning shaft is able to rotate and a long hole which is connected to the round hole and is able to engage with the pair of flat surface portions formed therein.

(4) In the treatment apparatus according to the foregoing (2) or (3), the movement device may include a detection portion detecting the locked state and the unlocked state.

(5) In the treatment apparatus according to the foregoing (4), the detection portion may include a light projection portion and a light reception portion facing each other with a gap therebetween. A part of the container fixing portion may be configured to move forward and rearward from between the light projection portion and the light reception portion due to parallel movement with respect to the container support portion.

(6) In the treatment apparatus according to any one of the foregoing (1) to (5), the lid portion may include a sealing material inserted into the accommodation portion and configured to seal by abutting an inner wall surface of the accommodation portion. The heat treatment device may include a heating block having an insertion hole into which the accommodation portion is inserted and heated. The sealing material may be positioned in the insertion hole in a state in which the accommodation portion is inserted into the insertion hole.

(7) In the treatment apparatus according to any one of the foregoing (1) to (6), at least some of the plurality of hole portions and the plurality of hook portions may be disposed between the plurality of accommodation portions in a coupling direction of the plurality of accommodation portions.

(8) In the treatment apparatus according to any one of the foregoing (1) to (7), the container may include coupling portions coupling the plurality of accommodation portions to each other. A passing hole allowing the hook portion to pass therethrough may be provided in the coupling portion at a position overlapping at least one of the plurality of hole portions.

(9) In the treatment apparatus according to the foregoing (6), an inner wall surface of the insertion hole may be in contact with or close to an insertion part excluding upper end portions of the plurality of accommodation portions.

(10) In the treatment apparatus according to the foregoing (9), the container may further include a plurality of sealing portions inserted into upper end opening portions of the plurality of accommodation portions.

(11) In the treatment apparatus according to the foregoing (10), the container may further include coupling portions coupling the plurality of accommodation portions to each other. The lid portion may have a flat plate shape having the same size as the coupling portions.

(12) In the treatment apparatus according to the foregoing (10) or (11), the plurality of sealing portions may be a plurality of projecting portions protruding downward from a lower surface of the lid portion.

(13) In the treatment apparatus according to the foregoing (12), an annular groove having the sealing material disposed therein may be formed on a circumferential surface of a lower end portion of each of the plurality of sealing portions.

(14) In the treatment apparatus according to any one of the foregoing (6) to (13), the sealing material may be a material having a lower modulus of elasticity than at least any of the plurality of accommodation portions and the lid portion.

(15) In the treatment apparatus according to any one of the foregoing (1) to (14), the container fixing portion may have a flat plate shape having the same size as the container support portion.

(16) In the treatment apparatus according to any one of the foregoing (1) to (15), the plurality of hook portions may be suspended from a lower surface of the container fixing portion in a gravity direction. Lower end portions of the plurality of hook portions may be bent in a direction orthogonal to the gravity direction.

(17) In the treatment apparatus according to the foregoing (3), a width of the long hole in the gravity direction may be a dimension allowing the pair of flat surface portions of the turning shaft to enter in a state in which the container fixing portion is closed.

(18) In the treatment apparatus according to the foregoing (6), the sealing material may be positioned on or below an upper surface of the heating block.

(19) A nucleic acid extraction system according to another aspect of the present invention may include the treatment apparatus according to any one of the foregoing (1) to (18). The nucleic acid extraction system may extract nucleic acid from cells of the sample.

(20) A nucleic acid analysis system according to another aspect of the present invention may include the nucleic acid extraction system according to the foregoing (19). The nucleic acid analysis system may analyze the extracted nucleic acid.

Advantageous Effects of Invention

According to an aspect of the present invention described above, it is possible to provide a treatment apparatus, a nucleic acid extraction system, and a nucleic acid analysis system capable of curbing leakage of vapor of a sample to the outside of a container.

DESCRIPTION OF EMBODIMENTS

Figure 1:
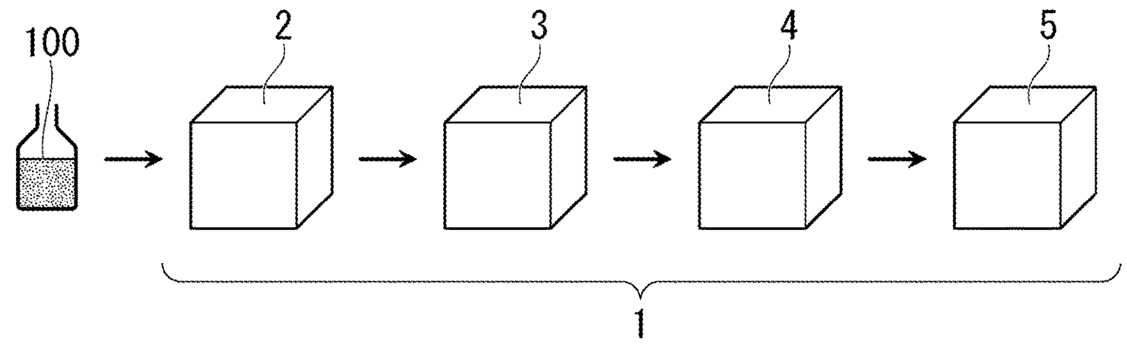
FIG. 1 is a schematic view of a nucleic acid analysis system according to a first embodiment.

Hereinafter, a treatment apparatus, a nucleic acid extraction system, and a nucleic acid analysis system according to embodiments of the present invention will be described in detail with reference to the drawings. In the following description, an overview of the embodiments of the present invention will be described first, and details of the embodiments of the present invention will be described subsequently.

[Overview]

In the foregoing automatic execution device for a polymerase chain reaction disclosed in Patent Document 2, a polymerase chain reaction is performed at a temperature near the boiling point. Therefore, the vapor pressure of a sample inside a container is equal to or lower than the atmospheric pressure, and the pressure acting in a direction in which a lid portion of the container is opened due to the vapor pressure is 1 atm or lower, which is not a large force. Accordingly, the lid portion will not be released even with the pressure-resistant structure disclosed in Patent Document 2. On the other hand, in the nucleic acid extraction method disclosed in Patent Document 1, a sample inside a container is heated to a temperature exceeding the boiling point for causing a reaction. Therefore, a vapor pressure of 1 atm or higher is generated so that there is a need to restrain the force acting in the direction in which the container lid portion is opened.

Particularly, in some bacteria or fungi, in order to destroy (dissolve) membrane structures of cells, there is a need to heat a sample to 120° C. to 180° C. for causing a reaction, which corresponds to 2 atm to 10 atm, and this requires a pressure-resistant structure. Particularly in recent years, with the increasing scale and advancement of analysis using nucleic acid, there has come to be cases in which a plurality of containers are arrayed in a column direction, a row direction, or both directions and treatment is performed with respect to a plurality of samples at the same time. Therefore, a force acting in the direction in which the container lid portion is opened tends to increase.

If such a pressure-resistant structure is adopted in a constitution in which a surface plate abuts a container lid portion as disclosed in Patent Document 2, the surface plate is warped due to the internal pressure. Therefore, there is a need to make the surface plate thick and heavy such that it does not bend. Consequently, this leads to increase in size of the device and operability of the device deteriorates. On the other hand, when a sufficient thickness of the surface plate has not been secured, the surface plate is warped due to the internal pressure, and a part of the container lid portion is opened. Therefore, vapor of a sample inside the container may leak out of the container, and the amount of sample may decrease. In addition, if a part of the container lid portion is opened, vapor of a sample inside the container continuously leaks outside, the sample temperature does not rise to an expected temperature due to latent heat from evaporation of the sample, and therefore an intended reaction does not occur.

According to the embodiments of the present invention, in a treatment apparatus, a nucleic acid extraction system, and a nucleic acid analysis system, a container support portion supporting a container and a container fixing portion pressing the container lid portion between the container fixing portion and the container support portion are engaged with each other by a plurality of hook portions, and a vapor pressure generated in each accommodation portion of the container is received by each hook portion. In addition, although the container fixing portion may be warped between the hook portion and the hook portion, since there are a plurality of hook portions, the warpage distance (span) between the hook portion and the hook portion is shortened, and therefore warpage of the entire container fixing portion is curbed. Accordingly, leakage of vapor of a sample to the outside of a container can be curbed.

First Embodiment

FIG. 1 is a schematic view of a nucleic acid analysis system 1 according to a first embodiment.

As illustrated in FIG. 1, the nucleic acid analysis system 1 includes a bacteria collection system 2, a nucleic acid extraction system 3, a hybridization reaction system 4, and a detection system 5.

The bacteria collection system 2 is a system for collecting bacteria (bacteria, fungi, or the like) included in a sample 100 from the sample 100. For example, in the case of an examination targeted on a beverage, the sample 100 is a manufactured beverage, water for manufacturing the beverage, a liquid in a process of manufacturing the beverage, or the like. Alternatively, the sample 100 may be a liquid obtained while collecting bacteria from a cotton swab or the like which has wiped up in an examination environment in order to examine for the presence or absence of bacterial contamination or the degree of contamination in a manufacturing environment.

For example, bacteria can be collected through filtering using a filter by applying compression or decompression to a collected liquid. For example, regarding a filter, in a case of collecting bacteria or fungi, it is preferable to use a filter having a pore diameter of 0.22 μm to 0.45 μm. After bacteria are collected using a filter, the filter may be immersed into a culture solution in which the bacteria are cultured, and the culture solution in which the bacteria are cultured may be used as the sample 100 in the next step (nucleic acid extraction system 3). Alternatively, a liquid in which bacteria are collected through centrifugal separation or the like, or a liquid in which an aggregate collected through centrifugal separation or the like has been dissolved may be used as the sample 100 in the next step. Alternatively, a liquid having a filter therein may be vibrated, and a liquid including suspended bacteria may be used as the sample 100 in the next step.

The nucleic acid extraction system 3 is a system for destroying (dissolving) membrane structures of cells in the sample 100 and extracting the nucleic acid of the cells. A liquid including a different nucleic acid reacting with the extracted nucleic acid may be mixed into the sample 100 with the extracted nucleic acid. In addition, the different nucleic acid may be a nucleic acid to which a part having fluorescence, luminescence, or a quenching action has been imparted under particular conditions to be used for detection in a detecting step (detection system 5), which will be described below. These may be mixed into the sample 100 before treatment is performed in the nucleic acid extraction system 3 or may be mixed into the sample 100 after treatment is performed in the nucleic acid extraction system 3.

The hybridization reaction system 4 is a system for causing a hybridization reaction in the nucleic acid in the sample 100. In this step, for example, the sample 100 is heated to 60° C. and agitated so that the foregoing hybridization reaction consistent with a different nucleic acid occurs. In this reaction, for example, the foregoing part having fluorescence, luminescence, or a quenching action under particular conditions and having been imparted to a different nucleic acid reacts with the nucleic acid in the sample 100, and therefore fluorescence, luminescence, or a quenching action is manifested.

By designing the foregoing structure of a different nucleic acid to react with a particular nucleic acid, for example, it can react with only the nucleic acid possessed by particular bacteria, fungi, or the like in the sample 100. Namely, in treatment of the hybridization reaction system 4, by using a different nucleic acid reacting with a particular nucleic acid, fluorescence, luminescence, or a quenching action imparted to the different nucleic acid can be manifested only when particular bacteria, fungi, or the like are included in the sample 100.

The detection system 5 detects the presence or absence, the degree, and the like of fluorescence, luminescence, or a quenching action manifested in the sample 100 subjected to treatment by the hybridization reaction system 4. For example, the detection system 5 excites the fluorescence action manifested in the nucleic acid in the sample 100 using an excitation laser beam and detects excited fluorescence using a high-sensitivity camera.

Alternatively, the detection system 5 detects the luminescence action manifested in the nucleic acid in the sample 100 using a high-sensitivity camera. Alternatively, regarding the quenching action manifested in the nucleic acid in the sample 100, the detection system 5 detects the degree of extinction of fluorescence or luminescence imparted to a part in the vicinity of the part to which the quenching action is imparted, using a high-sensitivity camera. For example, regarding this detection method, such a method disclosed in Japanese Unexamined Patent Application, First Publication No. 2020-74726 may be employed.

The nucleic acid analysis system 1 analyzes whether particular bacteria (bacteria, fungi, or the like) are included in the sample 100 or analyzes the concentration thereof using a series of systems described above.

Figure 2:
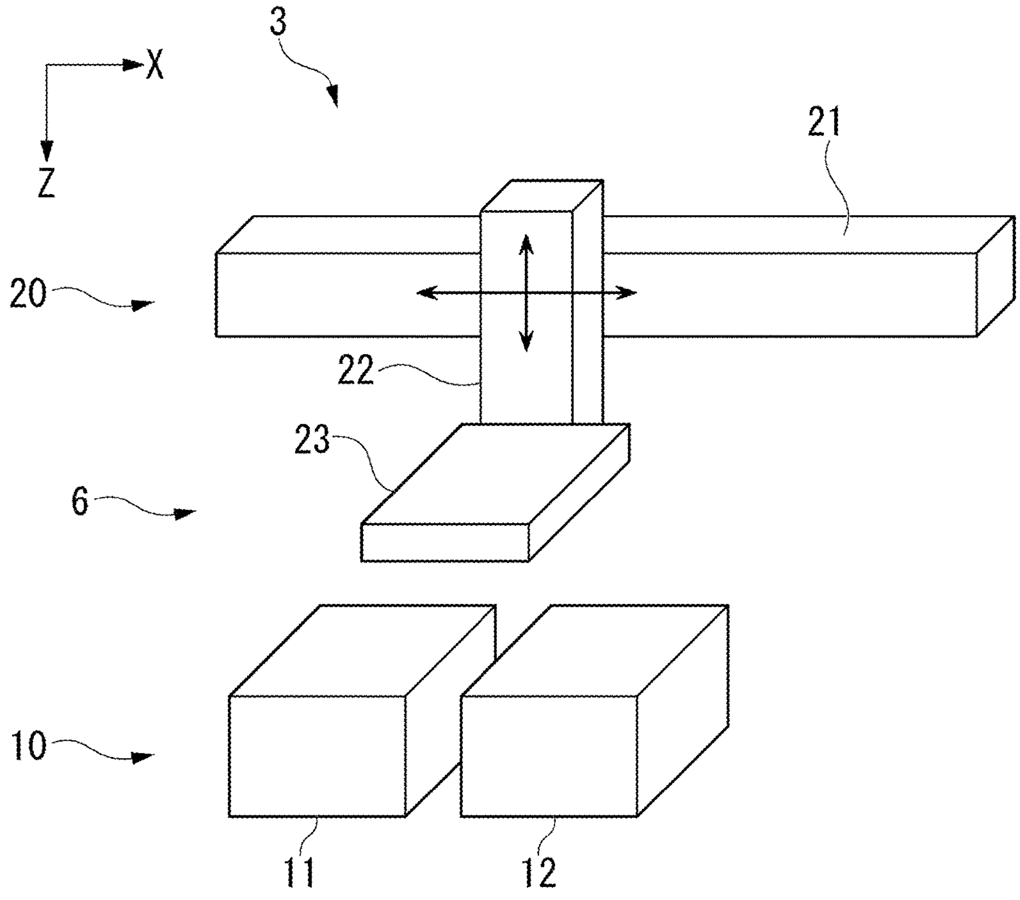
FIG. 2 is a schematic view of a nucleic acid extraction system according to the first embodiment.

FIG. 2 is a schematic view of the nucleic acid extraction system 3 according to the first embodiment.

As illustrated in FIG. 2, the nucleic acid extraction system 3 is provided with a treatment apparatus 6 including a heat treatment device 10 and a movement device 20. The heat treatment device 10 includes a heating block 11 and a cooling block 12. The movement device 20 includes a first actuator 21, a second actuator 22, and a container mounting portion 23.

Figure 3:
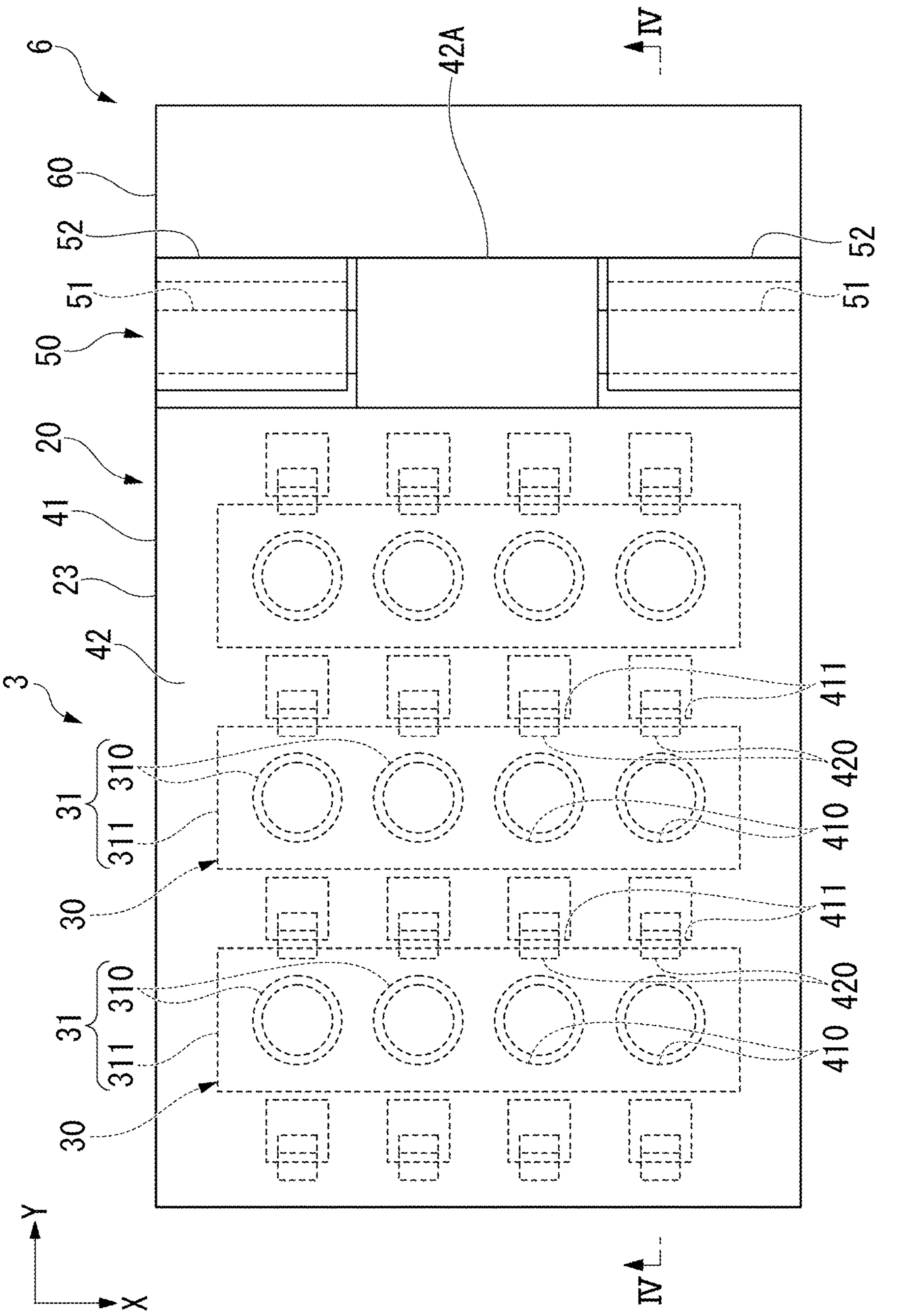
FIG. 3 is a plan view when a container mounting portion according to the first embodiment inserts a container into a heating block.
Figure 4:
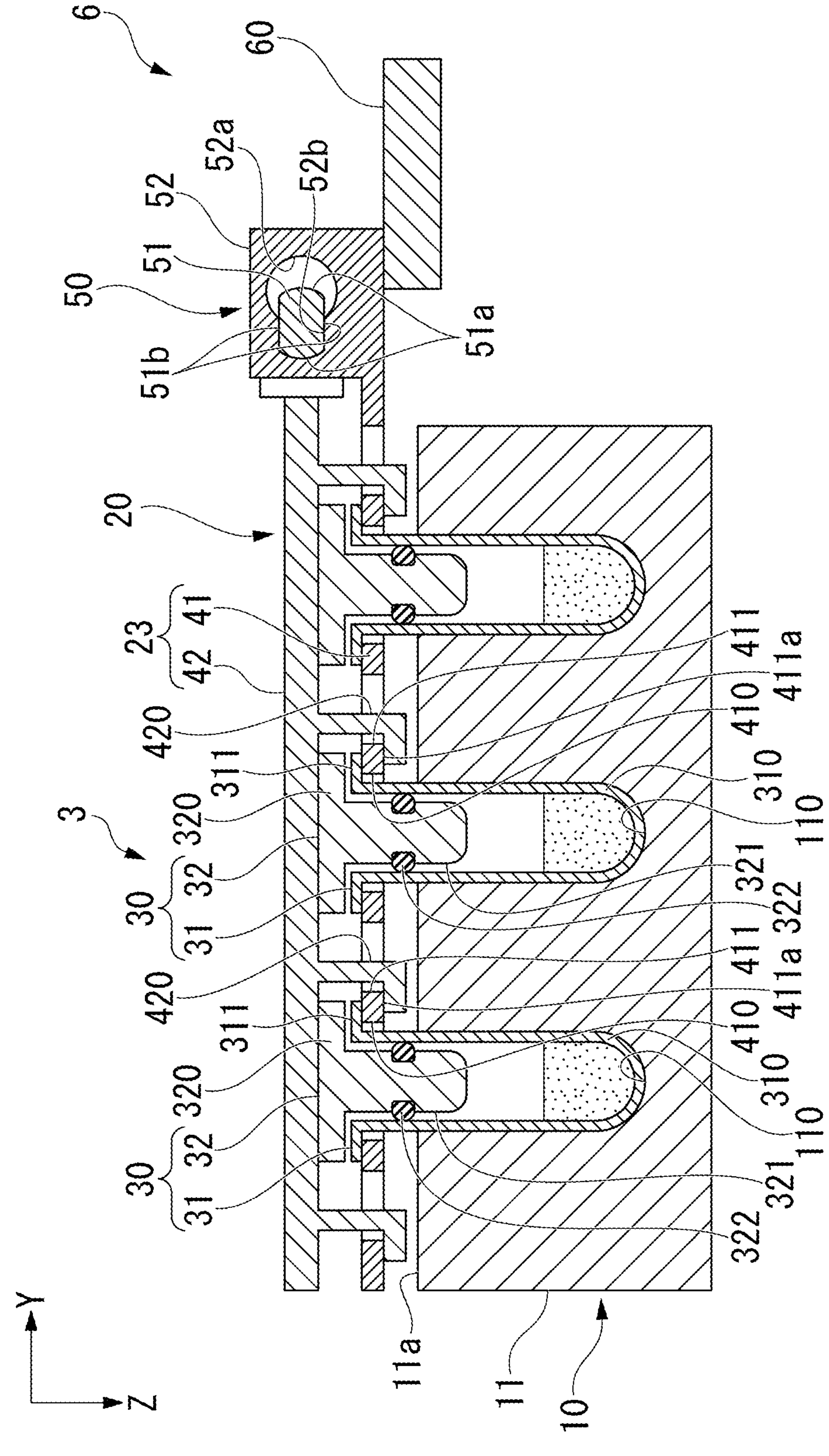
FIG. 4 is a cross-sectional view along arrow IV-IV indicated in FIG. 3.

In the following description, an XYZ orthogonal coordinate system may be set, and a positional relationship of each member may be described with reference to this XYZ orthogonal coordinate system. An X axis direction is a first horizontal direction in which the heating block 11 and the cooling block 12 are arranged. A Z axis direction is a gravity direction. A Y axis direction (not illustrated in FIG. 2) is a second horizontal direction orthogonal to the X axis direction and the Z axis direction as illustrated in FIGS. 3, 4, and the like, which will be described below.

The heating block 11 heats a containers 30 (refer to FIG. 3) accommodating the sample 100 described above. The cooling block 12 cools the containers 30 heated by the heating block 11. The container mounting portion 23 mounts the containers 30 in the movement device 20. The second actuator 22 moves the container mounting portion 23 in the Z axis direction. The first actuator 21 moves the second actuator 22 in the X axis direction.

The movement device 20 sequentially moves the containers 30 mounted in the container mounting portion 23 to the heating block 11 and then the cooling block 12. In this manner, a nucleic acid extraction reaction can be performed by moving the containers 30 from the heating block 11 to the cooling block 12 and heating and cooling the containers 30 and the sample 100 sealed in the containers 30.

The movement device 20 may be constituted to move the heat treatment device 10 (the heating block 11 and the cooling block 12) side with respect to the containers 30. In addition, when the first actuator 21 performs horizontal turning instead of straight motion, the heating block 11 and the cooling block 12 may be disposed on the same radius with respect to a turning axis of the first actuator 21.

FIG. 3 is a plan view when the container mounting portion 23 according to the first embodiment inserts the containers 30 into the heating block 11. FIG. 4 is a cross-sectional view along arrow IV-IV indicated in FIG. 3.

As illustrated in FIG. 3, a plurality of containers 30 are mounted in the container mounting portion 23 with an interval therebetween the Y axis direction.

As illustrated in FIG. 4, insertion holes 110 having parts of the containers 30 inserted therein are formed in the heating block 11. A plurality of insertion holes 110 are formed on an upper surface 11*a* of the heating block 11. For example, it is favorable that the heating block 11 be made of a metal material such as copper, aluminum, or stainless steel having a high heat conductivity. For example, the heating block 11 is heated by an electrothermal heater (not illustrated), a Peltier element, or a heat medium flowing through a flow channel (not illustrated) inside the block. The cooling block 12 illustrated in FIG. 2 has a constitution similar to that of the heating block 11 except that a heat medium flowing inside the flow channel inside the block is a refrigerant.

Alternatively, in place of a refrigerant, the cooling block 12 may be cooled by outside air at an ordinary temperature. In addition, the cooling block 12 may be provided with fins (not illustrated) in a part thereof such that cooling at an ordinary temperature is promoted or may be in contact with a fin member (not illustrated). Alternatively, the cooling block 12 may be cooled by a Peltier element (not illustrated).

As illustrated in FIG. 4, the containers 30 includes a container main body 31 and a lid 32. The container main body 31 includes a plurality of accommodation portions 310 accommodating the sample 100 and coupling portions 311 coupling the plurality of accommodation portions 310 to each other. Each of the accommodation portions 310 is formed to have a bottomed tubular shape and includes a hemispherical bottom portion 310*a* and a body portion 310*b* having a uniform outer diameter and extending in the Z axis direction. For example, the bottom portion 310*a* may be formed to have an inverted conical shape. In addition, in the bottom portion 310*a*, a tip having an inverted conical shape may have a curved surface such as a hemispherical shape. In addition, the body portion 310*b* may have an inclined shape in which the outer diameter is slightly reduced toward the lower portion in the Z axis direction, instead of a uniform outer diameter.

The insertion holes 110 are formed on the upper surface 11*a* of the heating block 11 as many as the number and in arrangement such that the plurality of accommodation portions 310 can be inserted therein. Inner wall surfaces of the insertion holes 110 are in contact with or close to an insertion part excluding upper end portions of the accommodation portions 310. Opening edge portions of the insertion holes 110 may be subjected to chamfering such as C-chamfering or R-chamfering such that the accommodation portions 310 are not damaged due to contact with the accommodation portions 310. As illustrated in FIG. 3, the plurality of accommodation portions 310 are arranged in a row in the X axis direction. The coupling portions 311 are formed to have a flat plate shape extending in the X axis direction and couple the upper end portions of the plurality of accommodation portions 310 to each other.

As illustrated in FIG. 4, the lid 32 includes lid portions 320 extending in the X axis direction and covering upper end opening portions of the plurality of accommodation portions 310, and a plurality of sealing portions 321 inserted into the upper end opening portions of the plurality of accommodation portions 310. The lid portions 320 have a flat plate shape having substantially the same size as the coupling portions 311 in a plan view. The plurality of sealing portions 321 are a plurality of projecting portions protruding downward from lower surfaces of the lid portions 320. An annular groove having a sealing material 322 disposed therein is formed on a circumferential surface of a lower end portion of each of the sealing portions 321. The sealing material 322 is formed to have an annular shape, is inserted into the accommodation portion 310, and performs sealing by abutting an inner wall surface of each of the accommodation portions 310.

It is desirable that the sealing materials 322 be materials having a lower modulus of elasticity than at least any of the accommodation portions 310 or the lid portions 320. Since the sealing materials 322 are deformed due to the low modulus of elasticity, the sealing portions 321 can be inserted into the upper end opening portions of the accommodation portions 310 with a smaller force. In addition, since the modulus of elasticity is low, the sealing materials 322 can reliably fill gaps between the annular grooves provided on the circumferential surfaces of the lower end portions of the sealing portions 321 and the accommodation portions 310, and the accommodation portions 310 can be reliably filled, and therefore leakage can be prevented. Regarding a material of the sealing materials 322, nitrile rubber, styrene-butadiene rubber, silicone rubber, fluorine rubber, a perfluoroelastomer, or the like can be used.

The container mounting portion 23 includes a container support portion 41 supporting the coupling portions 311 in a state in which the plurality of accommodation portions 310 are suspended, and a container fixing portion 42 overlapping the lid portions 320, sandwiching the containers 30 between the container fixing portion 42 and the container support portion 41, and provided in a manner of being able to be opened and closed with respect to the container support portion 41. The container support portion 41 is formed to have a grid shape having a plurality of penetration holes 410. The plurality of penetration holes 410 are formed in the container support portion 41 as many as the number and in arrangement such that the plurality of accommodation portions 310 can be inserted therein.

A plurality of hole portions 411 for fixing a container are provided in the container support portion 41 at positions adjacent to the plurality of penetration holes 410. As illustrated in FIG. 3, the plurality of hole portions 411 are formed to have a rectangular shape in a plan view. The plurality of hole portions 411 are formed in the container support portion 41 in a one-to-one correspondence with the plurality of accommodation portions 310 (plurality of penetration holes 410). The plurality of hole portions 411 form columns in the X axis direction and are formed in a plurality of columns with an interval therebetween in the Y axis direction. The columns of the accommodation portions 310 are disposed between the columns of the hole portions 411. Namely, the hole portions 411 are disposed on both sides of the accommodation portions 310 (penetration holes 410).

The container fixing portion 42 has a flat plate shape having substantially the same size as the container support portion 41 in a plan view. As illustrated in FIG. 4, a plurality of hook portions 420 inserted into the plurality of hole portions 411 of the container support portion 41 and engaging with edge portions 411*a* of the plurality of hole portions 411 are provided in the container fixing portion 42. The plurality of hook portions 420 are suspended in the Z axis direction from the lower surface of the container fixing portion 42, and the lower end portions thereof are bent in the Y axis direction and engage with the edge portions 411*a* of the hole portions 411 on the lower surface of the container support portion 41. The plurality of hook portions 420 are formed in the container fixing portion 42 as many as the number and in arrangement such that the plurality of hole portions 411 can be inserted therein.

The container mounting portion 23 includes a release restriction portion 50 switching between a locked state in which the container fixing portion 42 is unable to be released and an unlocked state in which the container fixing portion 42 is able to be released when the container fixing portion 42 performs parallel movement in the Y axis direction with respect to the container support portion 41. Here, as illustrated in FIG. 4, a locked state denotes a state in which the plurality of hook portions 420 engage with the edge portions 411*a* of the plurality of hole portions 411 and the container fixing portion 42 is unable to be released with respect to the container support portion 41.

Figure 5:
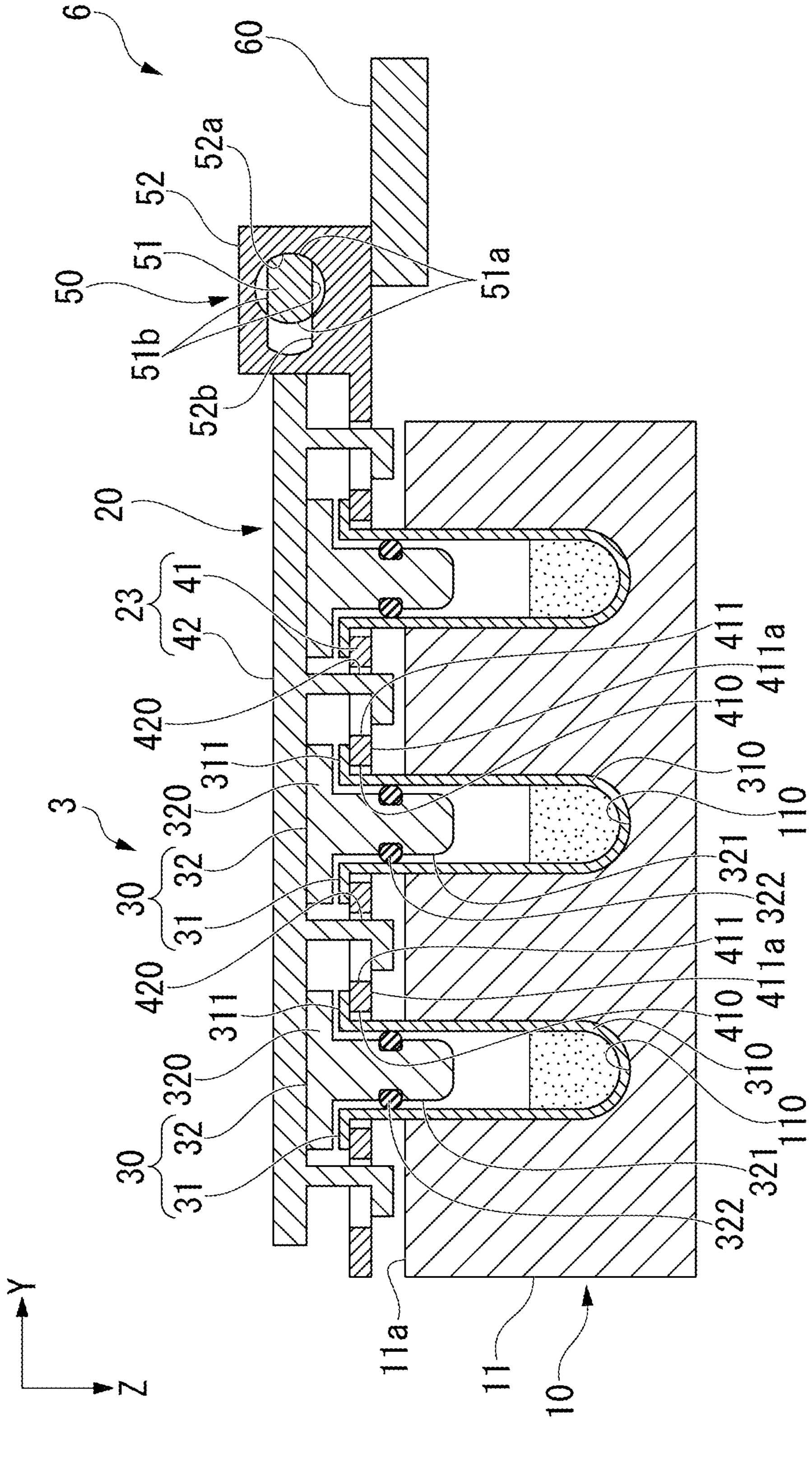
FIG. 5 is a cross-sectional view illustrating an unlocked state of a container fixing portion according to the first embodiment.
Figure 6:
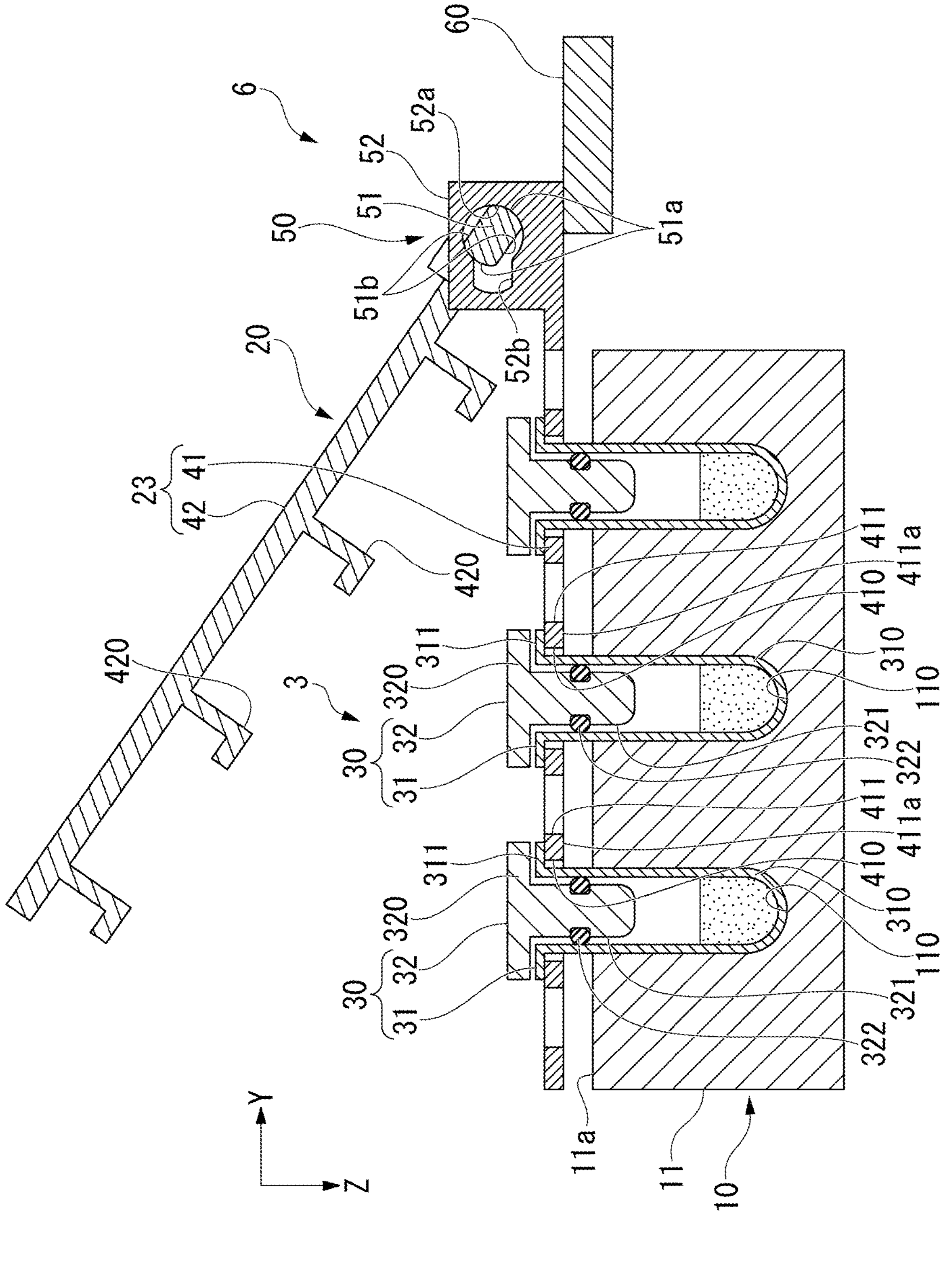
FIG. 6 is a cross-sectional view illustrating a state in which the container fixing portion according to the first embodiment is opened.

FIG. 5 is a cross-sectional view illustrating an unlocked state of the container fixing portion 42 according to the first embodiment. FIG. 6 is a cross-sectional view illustrating a state in which the container fixing portion 42 according to the first embodiment is opened.

As illustrated in FIG. 5, an unlocked state denotes a state in which the plurality of hook portions 420 are separated from the edge portions 411*a* of the plurality of hole portions 411 and the container fixing portion 42 is able to be released with respect to the container support portion 41. The container fixing portion 42 in an unlocked state can be lifted up as illustrated in FIG. 6 so that the containers 30 can be attached and detached with respect to the container support portion 41.

As illustrated in FIGS. 4 to 6, the release restriction portion 50 includes a turning shaft 51 provided in the container fixing portion 42, and a bearing portion 52 provided in the container support portion 41. The turning shaft 51 includes a pair of curved surface portions 51*a* and a pair of flat surface portions 51*b* connecting end portions of the pair of curved surface portions 51*a* to each other on the circumferential surface. Namely, the turning shaft 51 is formed to have an oval shape or a straw-bag shape in a cross-sectional view. As illustrated in FIGS. 4 and 5, the pair of flat surface portions 51*b* extend parallel to each other in the Y axis direction when the container fixing portion 42 is in a closed state.

The bearing portion 52 includes a round hole 52*a* in which the turning shaft 51 can rotate, and a long hole 52*b* which is connected to the round hole 52*a* and is able to engage with the pair of flat surface portions 51*b* of the turning shaft 51. Namely, a potbellied hole is formed in the bearing portion 52 in a cross-sectional view. The width of the long hole 52*b* in the Z axis direction is smaller than the diameter of the round hole 52*a*. In addition, the width of the long hole 52*b* in the Z axis direction is a dimension allowing the pair of flat surface portions 51*b* of the turning shaft 51 to enter in a state in which the container fixing portion 42 is closed. The long hole 52*b* extends in the Y axis direction from the round hole 52*a* in the same direction as a bent tip portion of the hook portion 420.

As illustrated in FIG. 4, the container mounting portion 23 having the foregoing constitution is constituted of the container support portion 41 and the container fixing portion 42, which can sandwich the container main body 31 and the lid 32 therebetween. A plurality of hook portions 420 are provided in the container fixing portion 42, and a plurality of hole portions 411 are provided in the container support portion 41 at positions which coincide with the hook portions 420. If the container support portion 41 is subjected to sliding movement in the Y axis direction with respect to the container fixing portion 42, the plurality of hook portions 420 engage with the edge portions 411*a* of the plurality of hole portions 411 and the container fixing portion 42 is unable to be released with respect to the container support portion 41 so that the containers 30 are fixed.

If the containers 30 are heated, the sample 100 evaporates in each of the accommodation portions 310. For example, in a case of the sample 100 in which water is one of main components, if the containers 30 are heated to 120° C., an internal pressure of approximately 2 atm is generated, and if they are heated to 180° C., an internal pressure of approximately 10 atm is generated. The container mounting portion 23 receives the internal pressure generated in each of the accommodation portions 310 in each of the hook portions 420 adjacent to the accommodation portions 310. Accordingly, a force received by the container mounting portion 23 from the containers 30 is dispersed. Therefore, even small-sized hook portions 420, the thin container fixing portion 42, and the container support portion 41 can receive a force acting in a direction in which the lid 32 is opened, and therefore the treatment apparatus 6 can have a simple and small-sized constitution.

Although the container fixing portion 42 may be warped between the hook portion 420 and the hook portion 420, since the plurality of hook portions 420 are provided, the warpage distance (span) between the hook portion 420 and the hook portion 420 is shortened, and warpage of the entire container fixing portion 42 is curbed. Accordingly, the lid 32 is unlikely to be released from the accommodation portions 310, and leakage of vapor of the sample 100 to the outside of the containers 30 can be curbed. That is, when the accommodation portions 310 are produced by injection molding of a resin, for example, even if the body portion 310*b* is produced in a perpendicular manner, it is slightly tapered in a manner of opening in a direction closer to the lid 32 in the Z axis direction. Here, if the lid 32 moves in a direction of opening from the accommodation portions 310, the gap between the lid 32 and the accommodation portions 310 increases, and therefore vapor is likely to leak. Therefore, due to the constitution described above, a force of the vapor pressure of the sample 100 can be received with a simple and small-sized structure, and therefore leakage of vapor of the sample 100 due to warpage of the container fixing portion 42 can be curbed.

Therefore, the treatment apparatus 6 of the first embodiment described above includes the heat treatment device 10 that performs heat treatment of the container 30 accommodating the sample 100, and the movement device 20 that relatively moves the container 30 with respect to the heat treatment device 10. The container 30 has a plurality of accommodation portions 310 accommodating the sample 100, and the lid portions 320 closing the plurality of accommodation portions 310. The movement device 20 has the container support portion 41 supporting the plurality of accommodation portions 310, and the container fixing portion 42 overlapping the lid portions 320, sandwiching the container 30 together with the container support portion 41, and provided in a manner of being able to be opened and closed with respect to the container support portion 41. Further, the plurality of hole portions 411 are provided in the container support portion 41. The plurality of hook portions 420 inserted into the plurality of hole portions 411 and engaging with the edge portions 411*a* of the plurality of hole portions 411 are provided in the container fixing portion 42. According to this constitution, it is possible to obtain the treatment apparatus 6, the nucleic acid extraction system 3 including the treatment apparatus 6, and the nucleic acid analysis system 1 including the nucleic acid extraction system 3 capable of curbing leakage of vapor of the sample 100 to the outside of the container 30.

The plurality of hole portions 411 may be provided in the container fixing portion 42 (that is, any one of the container support portion 41 and the container fixing portion 42) instead of the container support portion 41. In addition, the plurality of hook portions 420 may be provided in the container support portion 41 (that is, the other of the container support portion 41 and the container fixing portion 42) instead of the container fixing portion 42.

In addition, in the first embodiment, the movement device 20 has the release restriction portion 50 switching between a locked state in which the plurality of hook portions 420 engage with the edge portions 411*a* of the plurality of hole portions 411 and the container fixing portion 42 is unable to be released with respect to the container support portion 41 and an unlocked state in which the plurality of hook portions 420 are separated from the edge portions 411*a* of the plurality of hole portions 411 and the container fixing portion 42 is able to be released with respect to the container support portion 41 in response to relative parallel movement between the container support portion 41 and the container fixing portion 42. According to this constitution, a user can switch between a locked state and an unlocked state by performing relative parallel movement of the container support portion 41 and the container fixing portion 42 and can replace the container 30 easily in a short time.

In addition, in the first embodiment, the release restriction portion 50 has the turning shaft 51 provided in the container fixing portion 42 and including the pair of curved surface portions 51*a* and the pair of flat surface portions 51*b* connecting the end portions of the pair of curved surface portions 51*a* to each other on the circumferential surface, and the bearing portion 52 provided in the container support portion 41 and having the round hole 52*a* in which the turning shaft 51 is able to rotate and the long hole 52*b* which is connected to the round hole 52*a* and is able to engage with the pair of flat surface portions 51*b* formed therein. According to this constitution, by slidably moving the container fixing portion 42 with respect to the container support portion 41 from a locked state illustrated in FIG. 4, the hook portions 420 of the container fixing portion 42 are separated from the edge portions 411*a* of the hole portions 411 of the container support portion 41 as illustrated in FIG. 5. If the hook portions 420 move to positions where they can pass through the hole portions 411, as illustrated in FIG. 6, the container fixing portion 42 can be opened centering on the turning shaft 51. Moreover, if the container fixing portion 42 is turned and the container support portion 41 is moved to a substantially perpendicular state, a state in which there is no obstacle immediately above the container 30 can be realized, and therefore the sample 100 can be promptly replaced.

The turning shaft 51 may be provided in the container support portion 41 (that is, any one of the container support portion 41 and the container fixing portion 42) instead of the container fixing portion 42. In addition, the bearing portion 52 may be provided in the container fixing portion 42 (that is, the other of the container support portion 41 and the container fixing portion 42) instead of the container support portion 41.

Second Embodiment

Next, a second embodiment of the present invention will be described. In the following description, the same reference signs are applied to constituents which are the same as or equivalent to those of the embodiment described above, and description thereof will be simplified or omitted.

Figure 7:
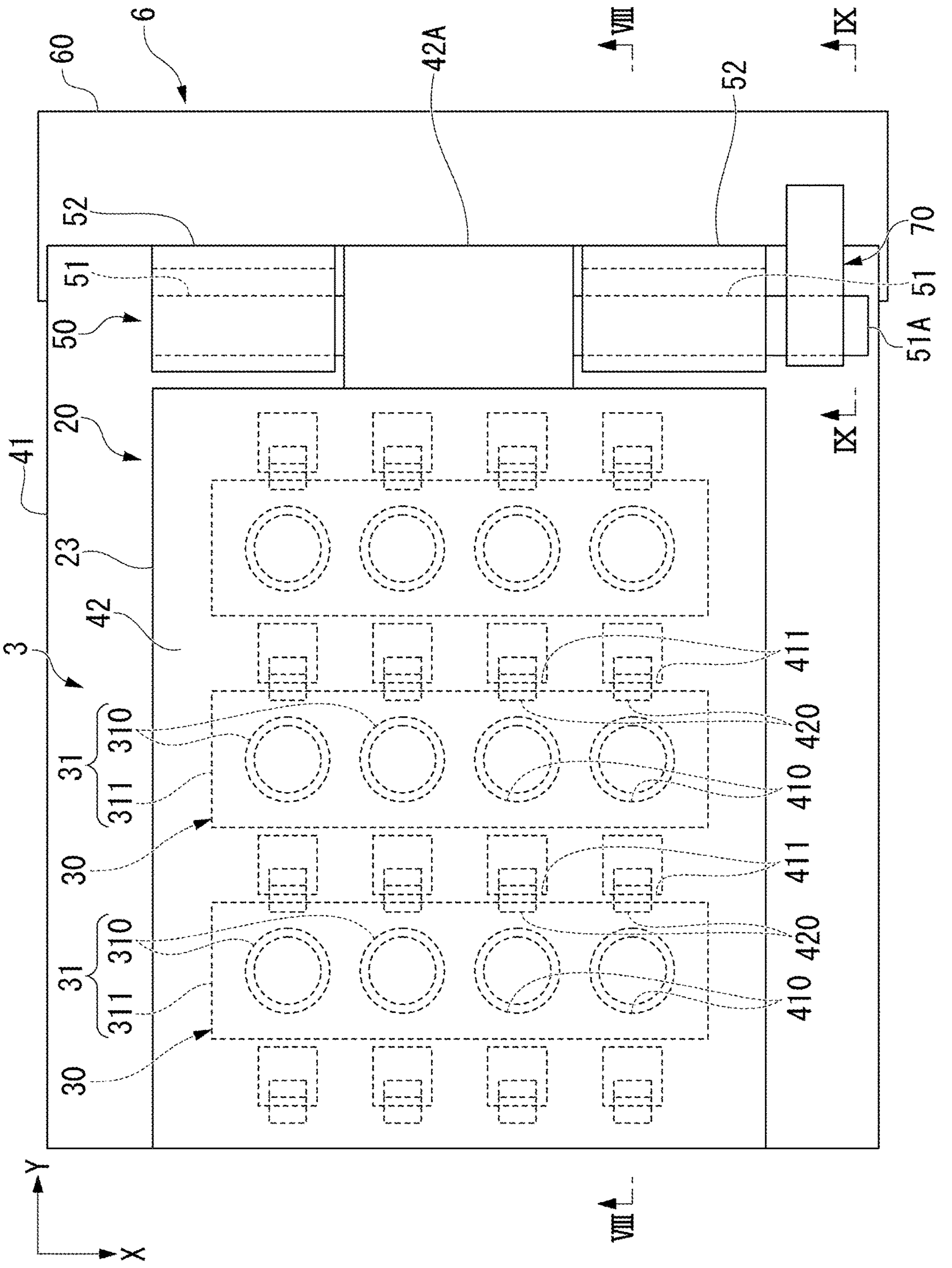
FIG. 7 is a plan view when the container mounting portion according to a second embodiment inserts the container into the heating block.
Figure 8:
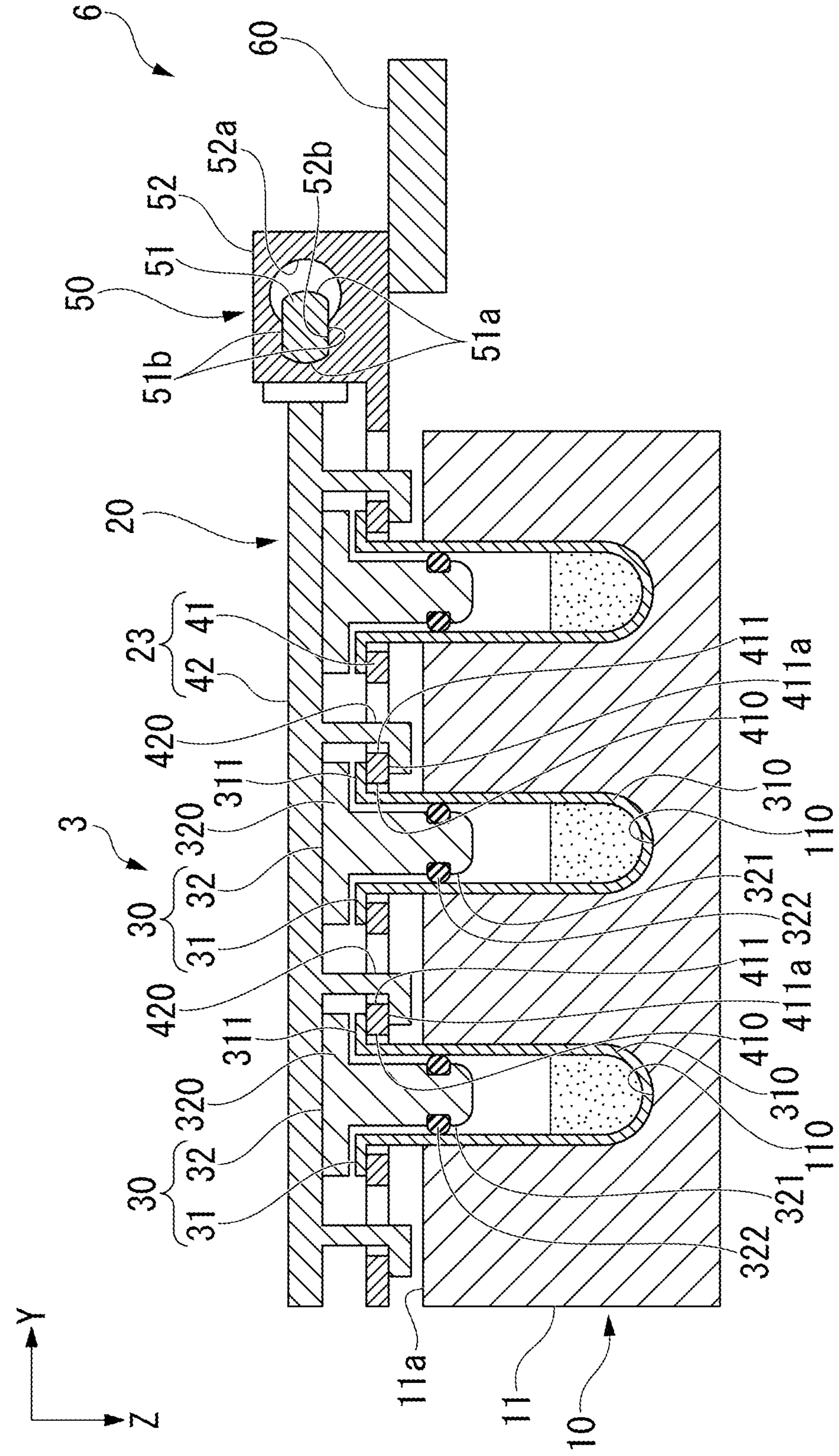
FIG. 8 is a cross-sectional view along arrow VIII-VIII indicated in FIG. 7.
Figure 9:
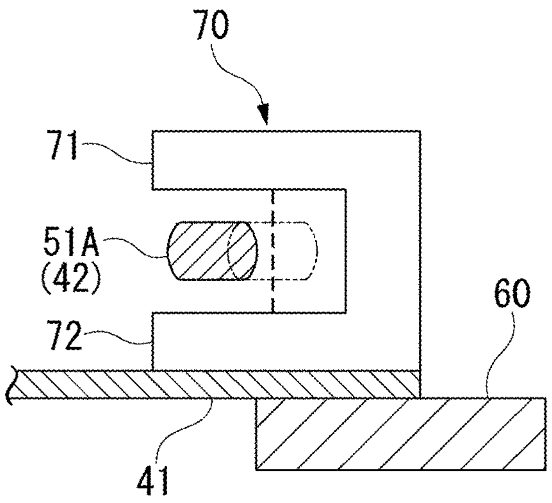
FIG. 9 is a cross-sectional view along arrow IX-IX indicated in FIG. 7.

FIG. 7 is a plan view when the container mounting portion 23 according to the second embodiment inserts the containers 30 into the heating block 11. FIG. 8 is a cross-sectional view along arrow VIII-VIII indicated in FIG. 7. FIG. 9 is a cross-sectional view along arrow IX-IX indicated in FIG. 7.

As illustrated in FIG. 8, the sealing materials 322 according to the second embodiment are positioned in the insertion holes 110 in a state in which the accommodation portions 310 of the containers 30 are inserted into the insertion holes 110.

In consideration of the thickness of the container support portion 41 and the lengths of the hook portions 420, the sealing materials 322 are positioned on or below the upper surface 11*a* of the heating block 11 or on or below the upper surface of the cooling block 12. According to this constitution, while a nucleic acid extraction reaction is performed by means of heating and cooling, it is possible to make a region in which the sample 100 inside the accommodation portion 310 and vapor thereof can be present inside the heating block 11 or the cooling block 12. For this reason, the temperatures of the sample 100 inside the accommodation portion 310 and vapor thereof can be brought closer to the temperature of the heating block 11 or the cooling block 12. Accordingly, the temperature of the sample 100 sealed in the accommodation portion 310 can be precisely changed, and therefore a nucleic acid extraction reaction is easily controlled.

In this manner, in the second embodiment, the lid portion 320 has the sealing material 322 inserted into the accommodation portion 310 and performing sealing by abutting the inner wall surfaces of the accommodation portions 310. The heat treatment device 10 has the heating block 11 (cooling block 12) having the insertion holes 110 into which the accommodation portions 310 are inserted and heated formed therein. The sealing materials 322 are positioned in the insertion holes 110 in a state in which the accommodation portions 310 are inserted into the insertion holes 110. According to this constitution, the temperature of the sample 100 sealed in the container 30 can be precisely controlled, and therefore the nucleic acid is easily extracted.

In addition, as illustrated in FIGS. 7 and 9, the movement device 20 according to the second embodiment includes a detection portion 70 detecting the locked state and the unlocked state of the containers 30 in the container mounting portion 23. As illustrated in FIG. 7, the detection portion 70 is provided in the container support portion 41 to which the container mounting portion 23 is attached. The container support portion 41 is connected to the second actuator 22 illustrated in FIG. 2 via a base portion 60 and moves in the X axis direction and the Z axis direction together with the container mounting portion 23.

As illustrated in FIG. 9, the detection portion 70 has a light projection portion 71 and a light reception portion 72 facing each other with a gap therebetween. Further, a part of the container fixing portion 42 (the turning shaft 51 in the example in FIG. 9) moves forward and rearward from between the light projection portion 71 and the light reception portion 72 in response to parallel movement with respect to the container support portion 41. For example, when the turning shaft 51 does not block detection light between the light projection portion 71 and the light reception portion 72, the container fixing portion 42 is in a locked state. In addition, when the turning shaft 51 blocks detection light between the light projection portion 71 and the light reception portion 72, the container fixing portion 42 is in an unlocked state (indicated by a two-dot dashed line in FIG. 9).

Figure 10:
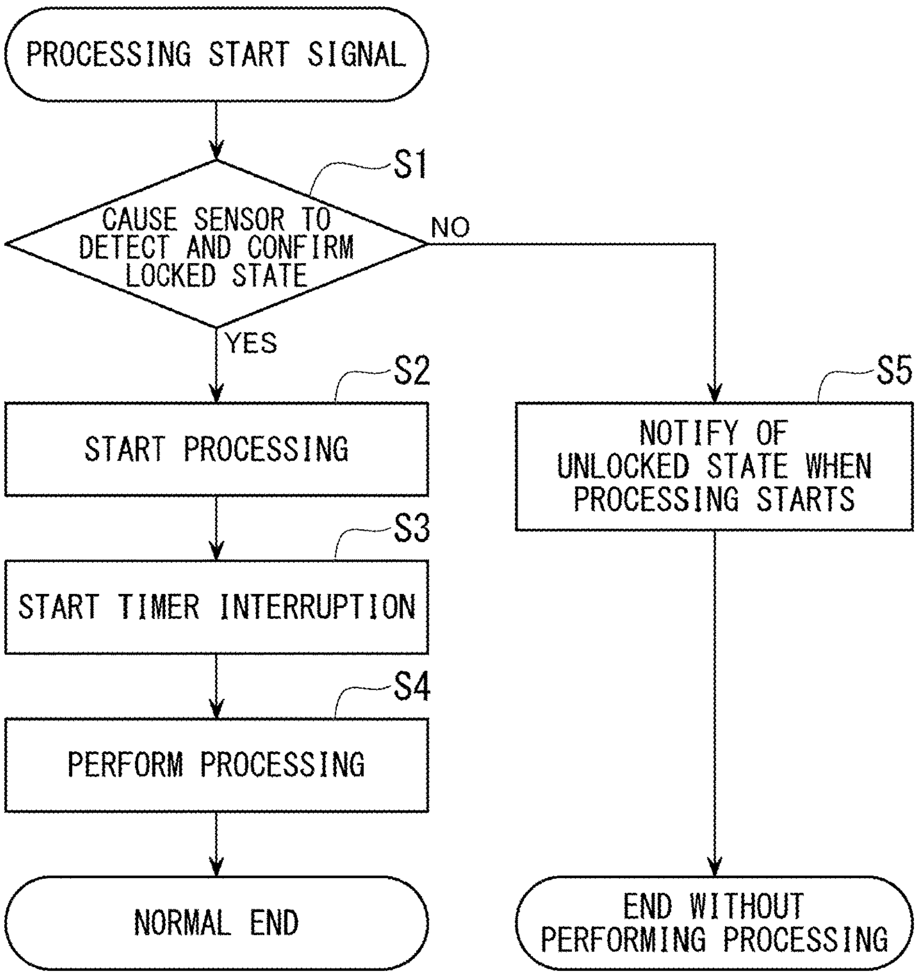
FIG. 10 is a flowchart of determination control in a locked state of the container fixing portion according to the second embodiment.

FIG. 10 is a flowchart of determination control in a locked state of the container fixing portion 42 according to the second embodiment.

As illustrated in FIG. 10, if a processing start signal for starting nucleic acid extraction processing is input, first, the locked state of the container fixing portion 42 is confirmed by the detection portion 70 (Step S1). When the container fixing portion 42 is in a locked state (when YES in Step S1), processing starts (Step S2).

On the other hand, when the container fixing portion 42 is not in a locked state (when NO in Step S1), it is assumed that the container fixing portion 42 is unlocked (Step S5), and the processing ends without being performed. In this case, it is favorable that the fact that the container fixing portion 42 has been unlocked be notified to a user by means of an operation screen of the treatment apparatus 6, sound, light, or the like.

When the processing starts (Step S2), timer interruption starts (Step S3). When the timer interruption starts, a signal for starting interruption processing (which will be described below) is output at predetermined intervals until the processing ends. Thereafter, the processing is performed (Step S4), and if there is no problem in timer interruption, the processing ends normally. In this manner, when the container fixing portion 42 is not in a locked state, the processing does not start. For example, even if a user gives an instruction to start the processing, motion of the actuator does not start. Accordingly, it is possible to prevent the processing from starting in an insufficiently locked state and the processing from failing.

Figure 11:
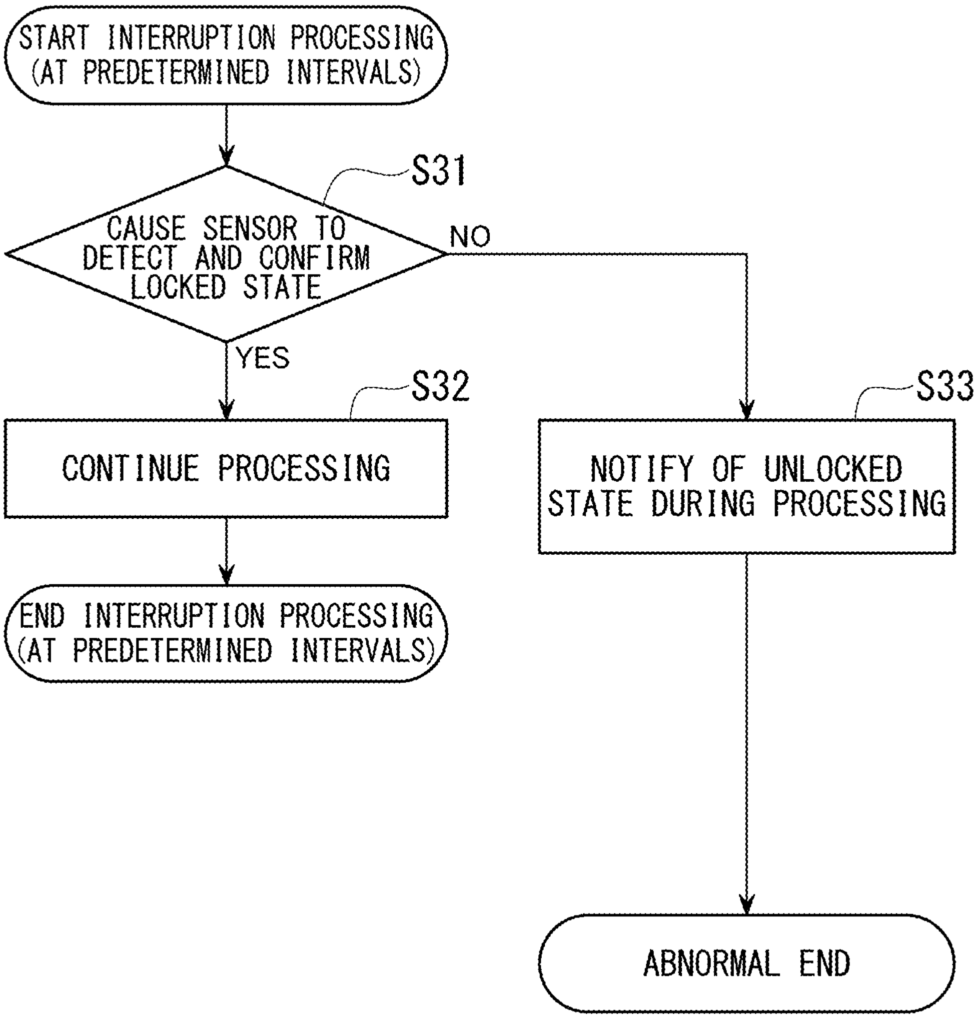
FIG. 11 is a flowchart of timer interruption processing according to the second embodiment.

FIG. 11 is a flowchart of timer interruption processing according to the second embodiment.

As illustrated in FIG. 11, if a signal for starting the foregoing interruption processing is received at predetermined intervals, interruption starts at predetermined intervals, and the locked state of the container fixing portion 42 is confirmed by the detection portion 70 (Step S31). When the container fixing portion 42 is in a locked state (when YES in Step S31), the processing continues (Step S32). The foregoing interruption processing performed at predetermined intervals is performed every time a signal for starting interruption processing is received at the foregoing predetermined intervals during the processing period.

On the other hand, when the container fixing portion 42 is not in a locked state (when NO in Step S31), it is assumed that the container fixing portion 42 is unlocked during the processing (Step S33), and the processing ends as abnormal ending. In this case, it is favorable that the fact that the container fixing portion 42 has been unlocked during the processing be notified to a user by means of an operation screen of the treatment apparatus 6, sound, light, or the like.

As above, even during the processing, it is confirmed whether the state in which the container fixing portion 42 is locked is continuing. When the container fixing portion 42 is unlocked, the processing is stopped, and occurrence of an abnormality is notified. Accordingly, a user can recognize a probability that it may be unlocked during the processing and the processing may have failed.

In this manner, in the second embodiment, the detection portion 70 detecting the locked state and the unlocked state of the container fixing portion 42 is provided. The detection portion 70 has the light projection portion 71 and the light reception portion 72 facing each other with a gap therebetween. A part of the container fixing portion 42 moves forward and rearward from between the light projection portion 71 and the light reception portion 72 in response to parallel movement with respect to the container support portion 41. According to this constitution, the detection portion 70 can detect that the container fixing portion 42 is reliably locked with respect to the container support portion 41 by the hook portions 420.

Third Embodiment

Next, a third embodiment of the present invention will be described. In the following description, the same reference signs are applied to constituents which are the same as or equivalent to those of the embodiments described above, and description thereof will be simplified or omitted.

Figure 12:
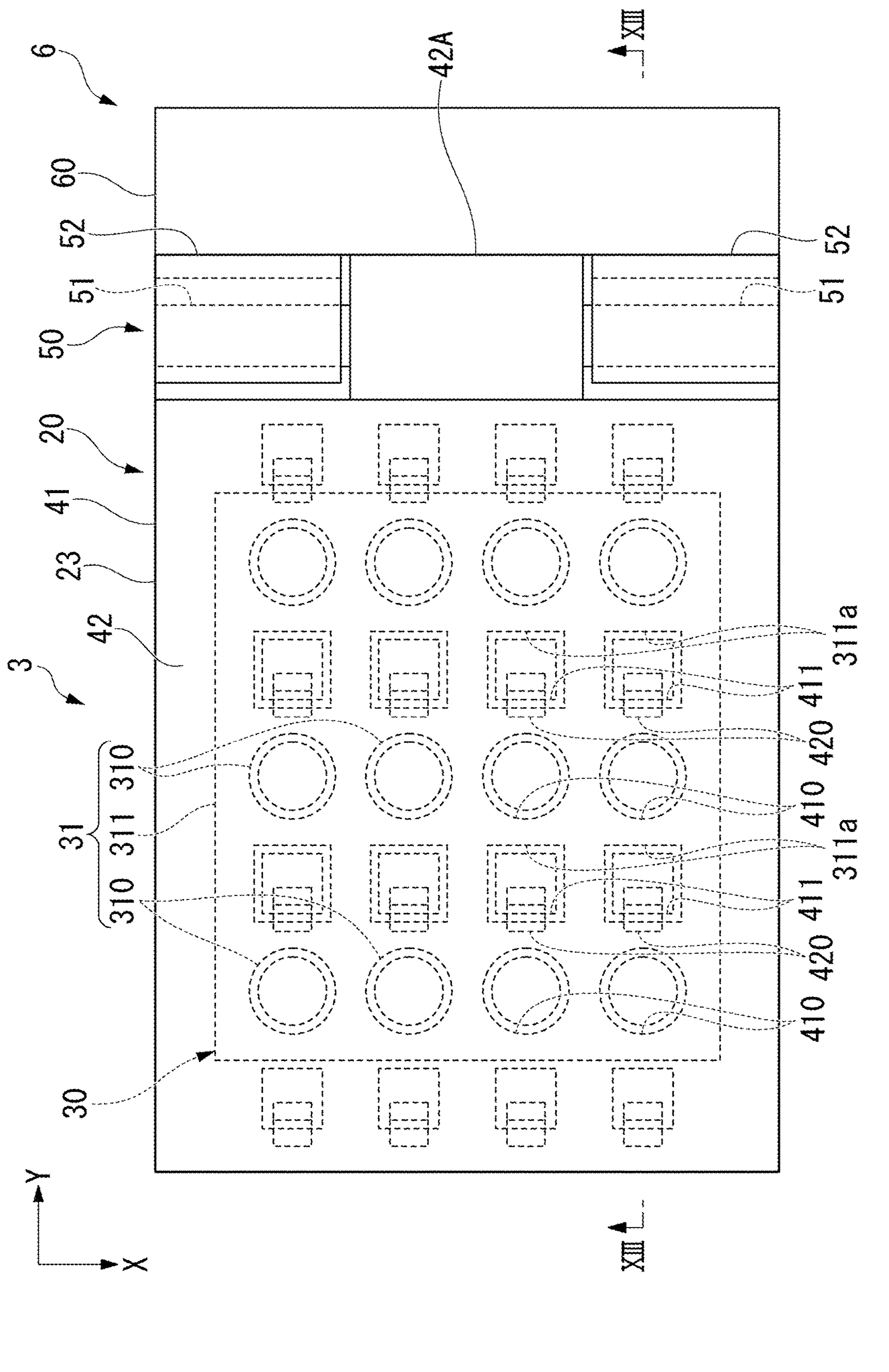
FIG. 12 is a plan view when the container mounting portion according to a third embodiment inserts the container into the heating block.
Figure 13:
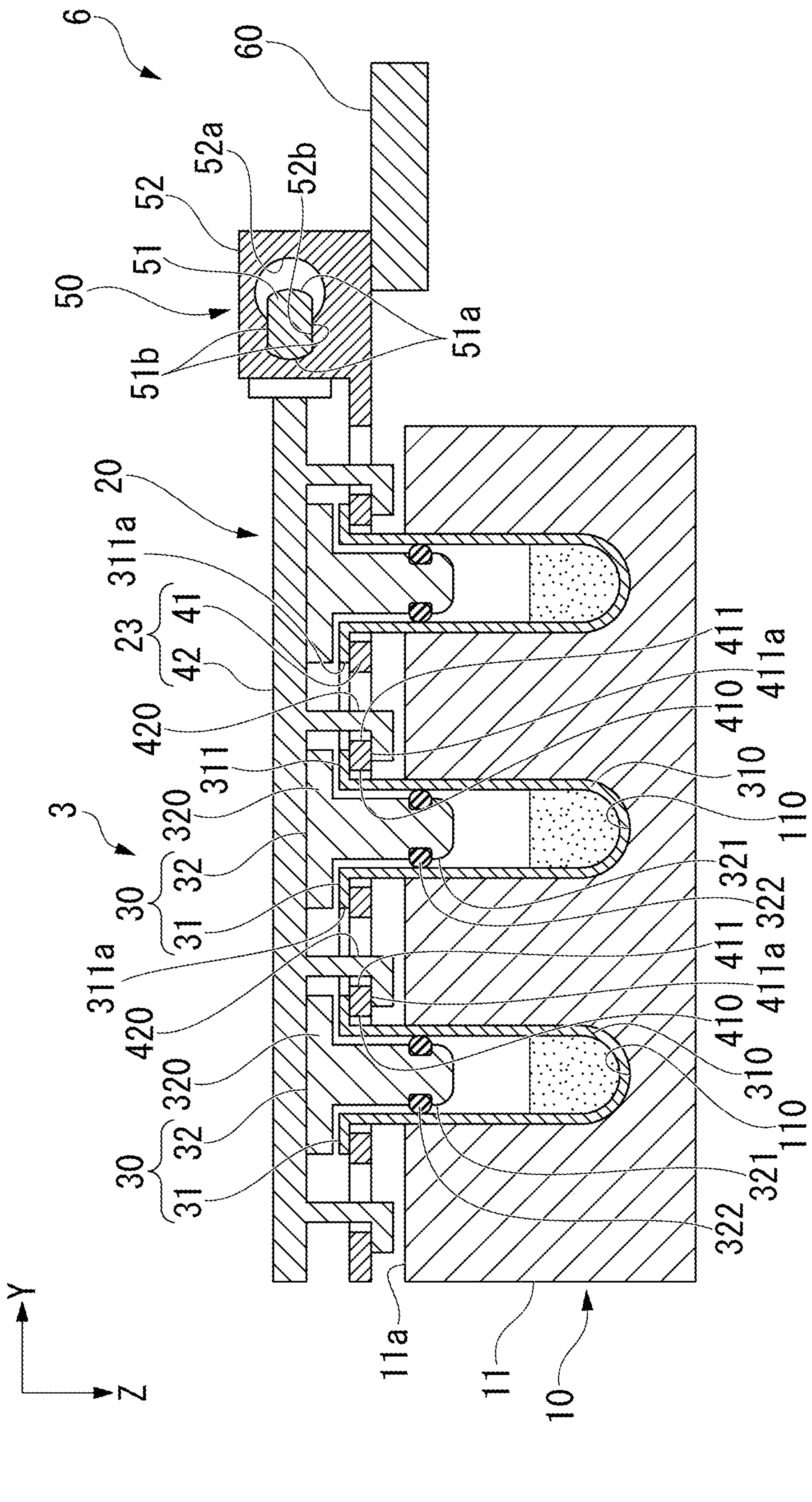
FIG. 13 is a cross-sectional view along arrow XIII-XIII indicated in FIG. 12.

FIG. 12 is a plan view when the container mounting portion 23 according to the third embodiment inserts the containers 30 into the heating block 11. FIG. 13 is a cross-sectional view along arrow XIII-XIII indicated in FIG. 12. As illustrated in FIG. 12, in the container 30 according to the third embodiment, the accommodation portions 310 are arrayed not only in the column direction (X axis direction) but also in the row direction (Y axis direction), and these are coupled to each other by the coupling portions 311.

A passing hole 311*a* through which the hook portion 420 can pass is provided in the coupling portion 311 at a position overlapping at least one of the plurality of hole portions 411 (the hole portion 411 excluding the columns of the hole portions 411 in both end portions of the container support portion 41 in the Y axis direction). According to this constitution, even in the container 30 having a surface structure in which the accommodation portions 310 are coupled to each other in the column direction and the row direction, the container support portion 41 and the container fixing portion 42 can be locked by the hook portions 420.

In the container 30 in which the accommodation portions 310 are coupled to each other in the column direction and the row direction, treatment of many samples 100 can be performed. With the increasing scale and advancement of analysis using nucleic acid, the container 30 having such a surface structure is used to meet the demands of performing many extractions of nucleic acid and analysis using extraction of nucleic acid, and therefore nucleic acid extraction processing can be reliably performed while the sample 100 inside the container 30 is prevented from leaking to the outside.

In addition, in the third embodiment, at least some of the plurality of hole portions 411 and the plurality of hook portions 420 (the hole portions 411 and the hook portions 420 excluding the columns of the hole portions 411 and the hook portions 420 in both end portions in the Y axis direction) are disposed between the plurality of accommodation portions 310 in the coupling direction of the plurality of accommodation portions 310. According to this constitution, warpage of the container fixing portion 42 can be effectively curbed between the plurality of accommodation portions 310. In this manner, it is desirable that the hole portions 411 and the hook portions 420 be disposed near the accommodation portions 310. Moreover, it is desirable that at least a pair of hole portions 411 and a pair of hook portions 420 be provided such that they straddle the accommodation portions 310. Furthermore, it is desirable to provide more hole portions 411 and hook portions 420 than the accommodation portions 310. When the gaps between the accommodation portions 310 are small, for example, the hole portions 411 and the hook portions 420 and the accommodation portions 310 may be disposed in a zig-zag manner in the column direction (X axis direction).

Fourth Embodiment

Next, a fourth embodiment of the present invention will be described. In the following description, the same reference signs are applied to constituents which are the same as or equivalent to those of the embodiments described above, and description thereof will be simplified or omitted.

Figure 14:
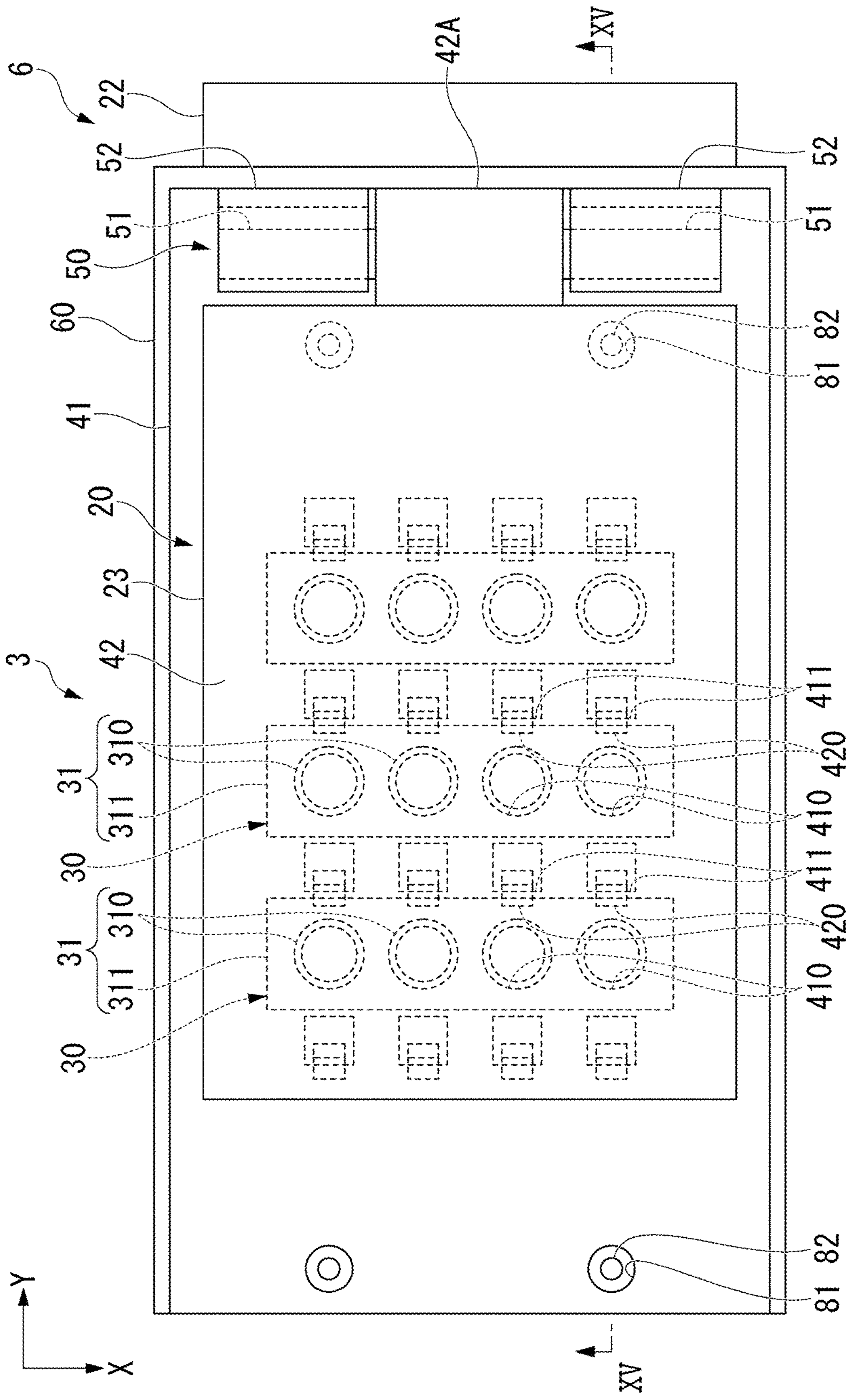
FIG. 14 is a plan view when the container mounting portion according to a fourth embodiment inserts the container into the heating block.
Figure 15:
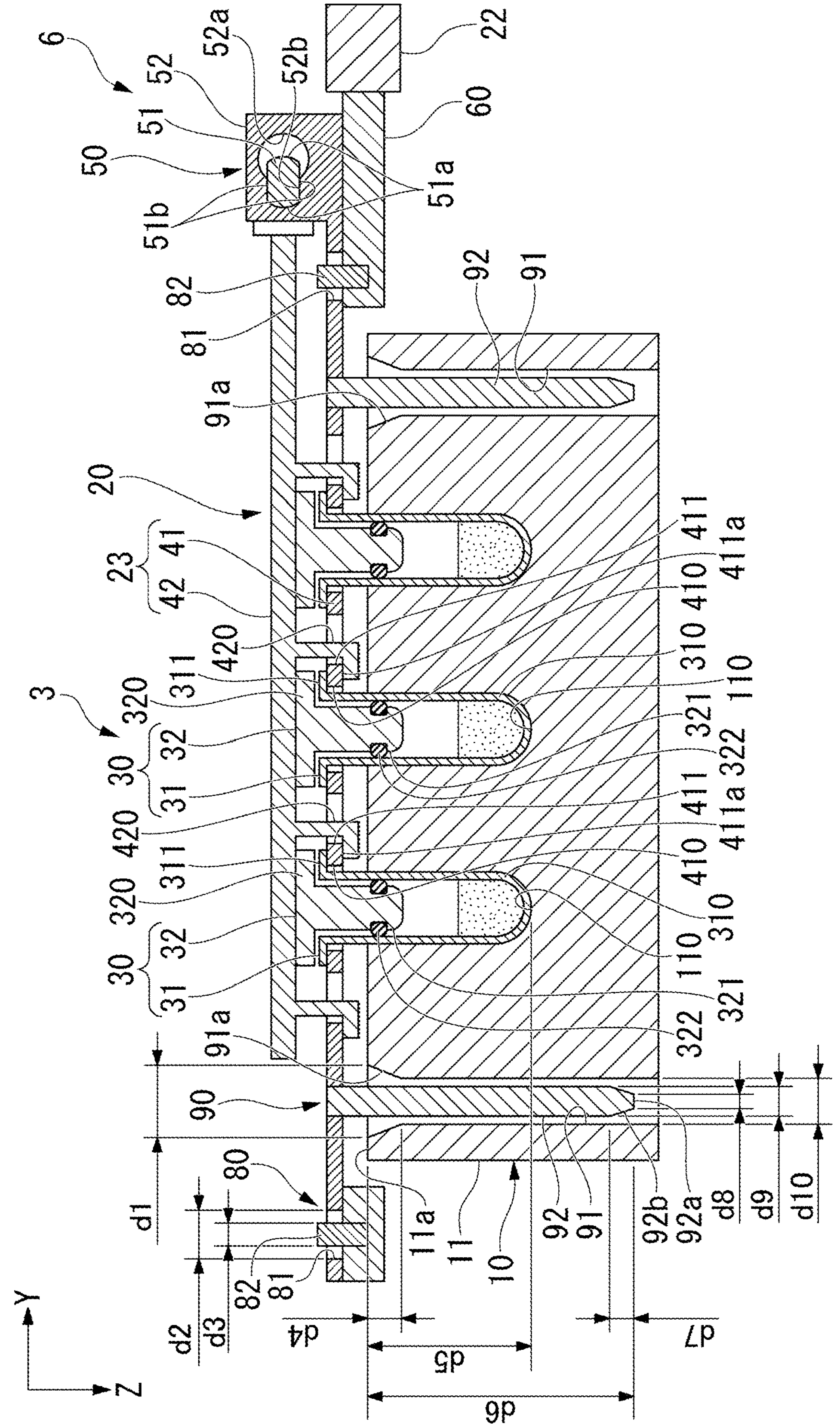
FIG. 15 is a cross-sectional view along arrow XV-XV indicated in FIG. 14.

FIG. 14 is a plan view when the container mounting portion 23 according to the fourth embodiment inserts the containers 30 into the heating block 11. FIG. 15 is a cross-sectional view along arrow XV-XV indicated in FIG. 14.

As illustrated in FIG. 15, the container support portion 41 according to the fourth embodiment is disposed on the base portion 60 connected to the second actuator 22. A restriction pin 82 serving as a restriction portion for restricting the position of the container support portion 41 within a certain range in the horizontal direction is provided in the base portion 60. In addition, a restriction hole 81 serving as a restriction portion, into which the restriction pin 82 is inserted, is provided in the container support portion 41.

Although illustration is omitted, a restriction portion for restricting movement of the container support portion 41 in the Z axis direction may further be provided in the base portion 60. In this case, for example, a structure in which a plate separated from the base portion 60 by a distance longer than the thicknesses of the container support portion 41 in a part performing restriction is provided on the base portion 60 and the container support portion 41 has the separated space included between the container support portion 41 and the plate may be adopted. Namely, the container support portion 41 can move in the Z axis direction by an amount obtained by subtracting the thickness from the amount of separation gap between the base portion 60 and the plate. In addition, since the container support portion 41 has a clearance in at least any of the base portion 60 and the separated plate, they can move in the X axis direction and the Y axis direction. The restriction portion in the Z axis direction may be a plate body provided in the upper end portion of the restriction pin 82. In addition, in place of the plate body, the restriction pin 82 may be a bolt or the like having a head diameter larger than the restriction hole 81.

The container support portion 41 is provided with a positioning pin 92 serving as a positioning unit 90 for positioning with respect to the heating block 11. The heating block 11 is provided with a positioning hole 91 serving as the positioning unit 90 into which the positioning pin 92 is inserted. The cooling block 12 illustrated in FIG. 2 also has a similar constitution.

The container mounting portion 23 is moved by the first actuator 21 and the second actuator 22, is relatively moved to a position immediately above the heating block 11 or the cooling block 12, and then is moved to the downward direction, and therefore the containers 30 are inserted into the insertion holes 110 provided in the heating block 11 or the cooling block 12.

At this time, first, the positioning pin 92 of the container support portion 41 is inserted into the positioning hole 91 of the heating block 11 or the cooling block 12, and the relative position thereof is set. Here, the relative position of the container support portion 41 can be finely adjusted with respect to the base portion 60 within a range in which the restriction pin 82 is included in the restriction hole 81.

Accordingly, even if thermal expansion occurs in the heating block 11 or the cooling block 12 due to temperature change thereof and the relative position thereof changes to a certain extent, the containers 30 can be reliably inserted into the insertion holes 110 of the heating block 11 or the cooling block 12. In addition, even if the accuracy of the first actuator 21 and the second actuator 22 is lowered to a certain extent, the containers 30 can be reliably inserted into the insertion holes 110 of the heating block 11 or the cooling block 12. Therefore, there is no need to use an actuator having high accuracy, and therefore the constitution of the device can be simplified.

As illustrated in FIG. 15, the positioning hole 91 may have an inclined surface 91*a* (tapered surface) such that the upper end opening portion thereof expands. Accordingly, the positioning hole 91 expands from a pore diameter d10 to a pore diameter d1 in the upper end opening portion.

Moreover, the positioning pin 92 may be formed to have an inverted truncated cone shape such that the lower end portion (tip portion) thereof is tapered. Accordingly, a pin diameter d9 of the positioning pin 92 is narrowed to a pin diameter d8 in the lower end portion thereof.

Here, if a deviation between the respective centers of the positioning pin 92 and the positioning hole 91 in the horizontal direction is smaller than the value of the following Expression (1), the positioning pin 92 can enter the positioning hole 91. That is, the positioning pin 92 can slide off at least the inclined surface 91*a* of the positioning hole 91.

$$(d1-d8)/2 \quad (1)$$

Incidentally, a range in which the container support portion 41 can relatively move on the base portion 60 is a range in which the restriction pin 82 can move in the restriction hole 81. Namely, the respective centers of the restriction pin 82 and the restriction hole 81 can deviate in the horizontal direction by the value of the following Expression (2), when the pin diameter of the restriction pin 82 is d3 and the pore diameter of the restriction hole 81 is d2.

$$(d2-d3)/2 \quad (2)$$

Namely, the relationship between at least the restriction hole 81, the restriction pin 82, the positioning hole 91, and the positioning pin 92 is required to satisfy the following Expression (4).

$$(d2-d3)/2<(d1-d8)/2 \quad (3)$$

Moreover, when the positional accuracy of the actuator is da and the amount of positional deviation due to thermal expansion caused by temperature change is dt, the following Expression (4) is required to be satisfied.

$$(d2-d3)/2+da+dt<(d1-d8)/2 \quad (4)$$

When the positioning hole 91 and the positioning pin 92 do not have the inclined surface 91*a* or a tapered shape, in each of the foregoing Expressions (1) to (4), d1 may be replaced with d10 and d8 may be replaced with d9.

Incidentally, it is desirable that the relative position between the container support portion 41 and the heating block 11 or the cooling block 12 be set before the accommodation portions 310 enter the insertion holes 110 provided in the heating block 11 or the cooling block 12.

Here, when the length of the tapered lower end portion of the positioning pin 92 is d7, the height of the inclined surface 91*a* of the positioning hole 91 is d4, and the depths of the insertion holes 110 are d5, it is desirable that a length d6 of the positioning pin 92 satisfy the following Expression (5).

$$d6-(d7+d4)>d5 \quad (5)$$

When the relationship of the foregoing Expression (5) is satisfied, the relative position between the heating block 11 or the cooling block 12 and the container support portion 41 is set by the positioning pin 92 and the positioning hole 91 before the accommodation portions 310 enter the insertion holes 110. For this reason, the accommodation portions 310 can be reliably inserted into the insertion holes 110.

When the positioning hole 91 and the positioning pin 92 do not have the inclined surface 91*a* or a tapered shape, d7 or d4 may be set to zero in the foregoing Expression (5).

The constitution according to the fourth embodiment is not limited to the diametric relationship and the positional relationship described above. It may be a constitution, in a similar manner, having a range in which the container support portion 41 can move on the base portion 60 has a geometric relationship such that the positioning pin 92 can enter the positioning hole 91.

Hereinabove, preferable embodiments of the present invention have been described with reference to the drawings, but the present invention is not limited to the foregoing embodiments. Various shapes, combinations, and the like of the constituent members described in the foregoing embodiments are examples and can be variously changed based on design requirements and the like within a range not departing from the gist of the present invention.

A part or the entirety of the treatment apparatus according to the embodiments described above can be appended as follows.

APPENDIX 1

A treatment apparatus includes a container mounting portion and an actuator moving the container mounting portion. The container mounting portion has a container support portion in which a plurality of insertion holes are formed, and a container fixing portion overlapping the container support portion and covering at least some of the plurality of insertion holes in a openable manner. In the container support portion, a plurality of hole portions are provided at positions adjacent to at least some of the plurality of insertion holes. The container fixing portion is provided with a plurality of hook portions which are inserted into the plurality of hole portions and engage with edge portions of the plurality of hole portions.

APPENDIX 2

A heat treatment system includes a container that has an accommodation portion capable of accommodating a sample and a lid portion closing the accommodation portion, and a heat treatment device that is provided with an insertion hole into which the accommodation portion of the container is inserted and heat treatment is performed. The lid portion has a sealing material which is inserted into the accommodation portion and performs sealing by abutting an inner wall surface of the accommodation portion. The sealing material is positioned in the insertion hole in a state in which the accommodation portion is inserted into the insertion hole.

The heat treatment system in the foregoing Appendix 2 is a system including the heat treatment device 10 and the containers 30 described above. The heat treatment device 10 in the heat treatment system includes at least one of the heating block 11 and the cooling block 12 described above. For instance, when a part of the region in which the sample 100 inside the accommodation portion 310 and vapor thereof can be present is outside the heating block 11 or the cooling block 12, there is concern that the thermal energy may be taken away due to state change such as aggregation of vapor and the temperature of the sample 100 may change. On the other hand, according to the constitution in Appendix 2, it is possible to make the region in which the sample 100 inside the accommodation portion 310 and vapor thereof can be present inside the heating block 11 or the cooling block 12. For this reason, the sample 100 inside the accommodation portion 310 and vapor thereof can be brought closer to the temperature of the heating block 11 or the cooling block 12. Accordingly, the temperature of the sample 100 sealed in the accommodation portion 310 can be precisely changed, and therefore a nucleic acid extraction reaction is easily controlled, for example.

In this specification, the terms such as "front, rear, up, down, right, left, perpendicular, horizontal, vertical, lateral, rows, and columns" indicating directions are mentioned regarding the directions thereof in the device of the present invention. Therefore, these terms in the specification of the present invention should be relatively interpreted in regard to the device of the present invention.

The term "constituted" is used in a case of being constituted to execute the functions of the present invention or used for indicating a constitution, an element, and a part of the device.

Moreover, the terms expressed as "means-plus-function" in the claims should include diverse structures which can be utilized to execute the functions included in the present invention.

The term "unit" is used for indicating a part of a constituent element, a unit, hardware, or software programmed to execute a desired function. A representative example of hardware is a device or a circuit, but it is not limited to these.

Hereinabove, preferable examples of the present invention have been described, but the present invention is not limited to these examples. Addition, omission, replacement, and other changes of the constituents can be made within a range not departing from the gist of the present invention. The present invention is not limited by the foregoing description and is limited by only the accompanying claims.

REFERENCE SIGNS LIST

1 Nucleic acid analysis system
3 Nucleic acid extraction system
6 Treatment apparatus
10 Heat treatment device
11 Heating block
20 Movement device
30 Container
41 Container support portion
42 Container fixing portion
50 Release restriction portion
51 Turning shaft
**51*a*** Curved surface portion
**51*b*** Flat surface portion
52 Bearing portion
**52*a*** Round hole
**52*b*** Long hole
70 Detection portion
71 Light projection portion
72 Light reception portion
100 Sample
110 Insertion hole
310 Accommodation portion
311 Coupling portion
**311*a*** Passing hole
320 Lid portion
322 Sealing material
411 Hole portion
**411*a*** Edge portion
420 Hook portion

The invention claimed is:

1. A treatment apparatus comprising:
a container comprising:
a plurality of accommodation portions accommodating a sample; and
a lid portion closing the plurality of accommodation portions; and
a heat treatment device configured to perform heat treatment of the container accommodating a sample, the heat treatment device comprising a heating block having a plurality of insertion holes into which the plurality of the accommodation portions is inserted and heated;
a movement device configured to relatively move the container with respect to the heat treatment device,
wherein the movement device comprises:
a container support portion configured to support the plurality of accommodation portions; and
a container fixing portion configured to overlap the lid portion, the container fixing portion being configured to sandwich the container together with the container support portion, and the container fixing portion configured to be opened and closed with respect to the container support portion,
wherein a plurality of hole portions are provided in any one of the container support portion and the container fixing portion, and
wherein a plurality of hook portions inserted into the plurality of hole portions and engaging with edge portions of the plurality of hole portions are provided in the other of the container support portion and the container fixing portion,
wherein the lid portion comprises a sealing material inserted into the accommodation portion and configured to seal by abutting an inner wall surface of the accommodation portion, and
wherein the heat treatment device comprises a heating block having an insertion hole into which the accommodation portion is inserted and heated, and wherein the sealing material is positioned in the insertion hole in a state in which the accommodation portion is inserted into the insertion hole.

2. The treatment apparatus according to claim 1, wherein the movement device comprises a release restriction portion switching between a locked state in which the plurality of hook portions engage with the edge portions of the plurality of hole portions and the container fixing portion is unable to be released with respect to the container support portion and an unlocked state in which the plurality of hook portions are separated from the edge portions of the plurality of hole portions and the container fixing portion is able to be released with respect to the container support portion in response to relative parallel movement between the container support portion and the container fixing portion.

3. The treatment apparatus according to claim 2, wherein the release restriction portion comprises:
a turning shaft provided in any one of the container support portion and the container fixing portion, the turning shaft including a pair of curved surface portions and a pair of flat surface portions connecting end portions of the pair of curved surface portions to each other on a circumferential surface; and
a bearing portion provided in the other of the container support portion and the container fixing portion, the bearing portion having a round hole in which the turning shaft is able to rotate and a hole which is connected to the round hole and is able to engage with the pair of flat surface portions formed therein.

4. The treatment apparatus according to claim 2, wherein the movement device comprises a detection portion configured to detect the locked state and the unlocked state.

5. The treatment apparatus according to claim 4, wherein the detection portion comprises a light projection portion and a light reception portion facing each other with a gap therebetween, and wherein a part of the container fixing portion is configured to move forward and rearward from between the light projection portion and the light reception portion due to parallel movement with respect to the container support portion.

6. The treatment apparatus according to claim 1, wherein at least some of the plurality of hole portions and the plurality of hook portions are disposed between the plurality of accommodation portions in a coupling direction of the plurality of accommodation portions.

7. The treatment apparatus according to claim 1, wherein the container comprises coupling portions coupling the plurality of accommodation portions to each other, and wherein a passing hole allowing the hook portion to pass therethrough is provided in the coupling portions at a position overlapping at least one of the plurality of hole portions.

8. The treatment apparatus according to claim 1, wherein an inner wall surface of the insertion hole is in contact with or close to an insertion part excluding upper end portions of the plurality of accommodation portions.

9. The treatment apparatus according to claim 8, wherein the container further comprises a plurality of sealing portions inserted into upper end opening portions of the plurality of accommodation portions.

10. The treatment apparatus according to claim 9, wherein the container further comprises coupling portions coupling the plurality of accommodation portions to each other, and wherein the lid portion has a flat plate shape having the same size as the coupling portions.

11. The treatment apparatus according to claim 9, wherein the plurality of sealing portions are a plurality of projecting portions protruding downward from a lower surface of the lid portion.

12. The treatment apparatus according to claim 11, wherein an annular groove having the sealing material disposed therein is formed on a circumferential surface of a lower end portion of each of the plurality of sealing portions.

13. The treatment apparatus accordingly to claim 1, wherein the sealing material is a material having a lower modulus of elasticity than at least one of the plurality of accommodation portions and the lid portion.

14. The treatment apparatus according to claim 1, wherein the container fixing portion has a flat plate shape having the same size as the container support portion.

15. The treatment apparatus according to claim 1, wherein the plurality of hook portions are suspended from a lower surface of the container fixing portion in a gravity direction, and wherein lower end portions of the plurality of hook portions are bent in a direction orthogonal to the gravity direction.

16. The treatment apparatus according to claim 3, wherein a width of the hole in a gravity direction is a dimension allowing the pair of flat surface portions of the turning shaft to enter in a state in which the container fixing portion is closed.

17. A nucleic acid extraction system comprising the treatment apparatus according to claim 1, the nucleic acid extraction system extracting nucleic acid from cells of the sample.

18. A nucleic acid analysis system comprising the nucleic acid extraction system according to claim 17, the nucleic acid analysis system analyzing the extracted nucleic acid.

* * * * *